United States Patent
Jungck

(10) Patent No.: US 7,437,482 B2
(45) Date of Patent: *Oct. 14, 2008

(54) METHOD AND APPARATUS FOR FACILITATING CLIENT SERVER COMMUNICATIONS OVER A NETWORK

(75) Inventor: Peder J. Jungck, San Carlos, CA (US)

(73) Assignee: Cloudshield Technologies, Inc., Sunnyvale, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 10/853,294

(22) Filed: May 25, 2004

(65) Prior Publication Data

US 2005/0021863 A1    Jan. 27, 2005

Related U.S. Application Data

(63) Continuation of application No. 09/602,129, filed on Jun. 23, 2000, now Pat. No. 6,829,654.

(51) Int. Cl.
    *G06F 15/16* (2006.01)
(52) U.S. Cl. .......... 709/246; 725/141; 709/229
(58) Field of Classification Search ........... 709/246, 709/206, 224, 229; 705/74; 726/12, 5
    See application file for complete search history.

(56) References Cited

U.S. PATENT DOCUMENTS

| | | | |
|---|---|---|---|
| 5,805,820 A | 9/1998 | Bellovin et al. | 395/200.55 |
| 5,831,609 A | 11/1998 | London et al. | 345/746 |
| 5,938,737 A | 8/1999 | Smallcomb et al. | 709/247 |
| 5,953,503 A | 9/1999 | Mitzenmacher et al. | 395/200.33 |
| 5,991,713 A | 11/1999 | Unger et al. | 704/9 |
| 5,996,011 A * | 11/1999 | Humes | 709/225 |
| 6,006,264 A | 12/1999 | Colby et al. | 709/226 |
| 6,014,660 A | 1/2000 | Lim et al. | 707/3 |
| 6,016,512 A | 1/2000 | Huitema | 709/245 |

(Continued)

FOREIGN PATENT DOCUMENTS

EP    0 865 180 A2    3/1998    ............ 12/56

(Continued)

OTHER PUBLICATIONS

A common multi-agent testbed for diverse seamless personal information networking applications Abu-Hakima, S.; Liscano, R.; Impey, R.; Communications Magazine, IEEE vol. 36, Issue 7, Jul. 1998 pp. 68-74.*

(Continued)

*Primary Examiner*—Thong H Vu
(74) *Attorney, Agent, or Firm*—James L. Katz; Brinks Hofer Gilson & Lione

(57) ABSTRACT

An apparatus and method for enhancing the infrastructure of a network such as the Internet is disclosed. Multiple edge servers and edge caches are provided at the edge of the network so as to cover and monitor all points of presence. The edge servers selectively intercept domain name translation requests generated by downstream clients, coupled to the monitored points of presence, to subscribing Web servers and provide translations which either enhance content delivery services or redirect the requesting client to the edge cache to make its content requests. Further, network traffic monitoring is provided in order to detect malicious or otherwise unauthorized data transmissions.

58 Claims, 6 Drawing Sheets

U.S. PATENT DOCUMENTS

| | | | |
|---|---|---|---|
| 6,046,980 A | 4/2000 | Packer | 370/230 |
| 6,052,718 A | 4/2000 | Gifford | 709/219 |
| 6,065,055 A | 5/2000 | Hughes et al. | 709/229 |
| 6,070,191 A | 5/2000 | Narendran et al. | 709/226 |
| 6,073,168 A | 6/2000 | Mighdoll et al. | 709/217 |
| 6,084,878 A | 7/2000 | Crayford et al. | 370/389 |
| 6,101,549 A | 8/2000 | Baugher et al. | 709/238 |
| 6,108,703 A | 8/2000 | Leighton et al. | 709/226 |
| 6,119,165 A * | 9/2000 | Li et al. | 709/229 |
| 6,167,438 A | 12/2000 | Yates et al. | 709/216 |
| 6,167,441 A | 12/2000 | Himmel | 709/217 |
| 6,226,635 B1 * | 5/2001 | Katariya | 707/4 |
| 6,256,671 B1 | 7/2001 | Strentzsch et al. | 709/227 |
| 6,256,739 B1 | 7/2001 | Skopp et al. | 713/201 |
| 6,285,679 B1 | 9/2001 | Dally et al. | |
| 6,289,095 B1 | 9/2001 | Buttitta et al. | 379/220.01 |
| 6,324,582 B1 | 11/2001 | Sridhar et al. | |
| 6,324,585 B1 | 11/2001 | Zhang et al. | |
| 6,330,561 B1 | 12/2001 | Cohen et al. | 707/10 |
| 6,389,462 B1 | 5/2002 | Cohen et al. | 709/218 |
| 6,393,026 B1 | 5/2002 | Irwin | |
| 6,397,246 B1 * | 5/2002 | Wolfe | 709/217 |
| 6,408,336 B1 | 6/2002 | Schneider et al. | |
| 6,425,003 B1 | 7/2002 | Herzog et al. | |
| 6,453,335 B1 * | 9/2002 | Kaufmann | 709/203 |
| 6,473,406 B1 * | 10/2002 | Coile et al. | 370/248 |
| 6,480,508 B1 | 11/2002 | Mwikalo et al. | 370/475 |
| 6,502,135 B1 | 12/2002 | Munger et al. | 709/225 |
| 6,546,423 B1 | 4/2003 | Dutta et al. | 709/225 |
| 6,578,073 B1 | 6/2003 | Starnes et al. | 709/219 |
| 6,581,090 B1 | 6/2003 | Lindbo et al. | |
| 6,584,508 B1 * | 6/2003 | Epstein et al. | 709/229 |
| 6,587,466 B1 | 7/2003 | Bhattacharya et al. | 370/395.21 |
| 6,598,034 B1 | 7/2003 | Kloth | 706/47 |
| 6,604,143 B1 * | 8/2003 | Nagar et al. | 709/229 |
| 6,611,863 B1 * | 8/2003 | Banginwar | 709/220 |
| 6,611,875 B1 | 8/2003 | Chopra et al. | 709/245 |
| 6,654,787 B1 * | 11/2003 | Aronson et al. | 709/206 |
| 6,662,213 B1 | 12/2003 | Xie et al. | 709/206 |
| 6,691,231 B1 * | 2/2004 | Lloyd et al. | 726/5 |
| 6,772,347 B1 | 8/2004 | Xie et al. | 713/201 |
| 6,826,694 B1 | 11/2004 | Dutta et al. | 713/201 |
| 6,832,256 B1 * | 12/2004 | Toga | 709/229 |
| 6,950,947 B1 * | 9/2005 | Purtell et al. | 726/12 |
| 7,020,700 B1 * | 3/2006 | Bennett et al. | 709/224 |
| 7,069,249 B2 * | 6/2006 | Stolfo et al. | 705/74 |
| 7,146,505 B1 * | 12/2006 | Harada et al. | 713/185 |
| 2002/0112073 A1 | 8/2002 | MeLampy et al. | 709/240 |
| 2003/0018796 A1 | 1/2003 | Chou et al. | 709/231 |
| 2004/0254921 A1 * | 12/2004 | Cohen et al. | 707/3 |

FOREIGN PATENT DOCUMENTS

| | | | | |
|---|---|---|---|---|
| WO | WO 98/17039 | 4/1998 | | 29/2 |
| WO | WO 99/05584 | 2/1999 | | |
| WO | WO 99/09725 | 2/1999 | | 29/6 |
| WO | WO 99/27684 | 6/1999 | | 12/28 |
| WO | WO 99/60459 | 11/1999 | | |
| WO | WO 00/14938 | 3/2000 | | 29/0 |
| WO | WO 00/27092 | 5/2000 | | 29/12 |
| WO | WO 00/28713 | 5/2000 | | 29/2 |

OTHER PUBLICATIONS

Rule-based filtering for Java applets Iglio, P.; Fraticelli, F.; Giuri, L.; Computer Security Applications Conference, 1998, Proceedings., 14th Annual Dec. 7-11, 1998 pp. 112-119.*

John Pescatore, Gartner Analyst, "Commentary: Digging into the DNS foundation," obtained at internet address, http://news.cnet.com/news/0-1005-202-2080091.html, Jun. 15, 2000.

Rainbow Technologies Products, "CryptoSwift eCommerce Accelerator," obtained at internet address, http://isg.rainbow.com/products/cs_1.html, Aug. 5, 2000.

FlowWise Networks, Inc., "AutoRoute™ Automatic Configuration of Layer 3 Routing," www.flowwise.com.

FlowWise, "Router Accelerator—RA 7000 from FlowWise," obtained at internet address http://www.flowise.com/products/ra7000.htm.

Intel® IXP1200 Network Processor, obtained at internet address, http://developer.intel.com/design/network.ixp1200.htm.

Marshall Brain, How Stuff Works, "How Web Servers and the Internet Work," obtained at internet address http://www.howstuffworks.com/web-server.htm.

Marshall Brain, How Stuff Works, "How Domain Name Servers Work," obtained at internet address http://www.howstuffworks.com/dns.htm.

Curt Franklin, How Stuff Works, "How Routers Work," obtained at internet address http://www.howstuffworks.com/router.htm.

Microsoft Corporation, Sep. 1998 "Introduction to TCP/IP," obtained at internet address http://msdn.microsoft.com/library/backgrnd/html/tcpipintro.htm.

Robert Stone, "CenterTrack: An IP Overlay Network for Tracking DoS Floods," Article Oct. 1, 1999, pp. 1-9.

Chapter 1 TCP/IP Fundamentals, obtained at internet address http://webdocs.sequent.com/docs/tcpoac01/ch_1.htm, pp. 1-28.

Cheng Wu, "Web Switching: A New Generation of Networking," pp. 1-3.

ArrowPoint Communications™ Article, "A Comparative Analysis of Web Switching Architectures," pp. 1-11.

ArrowPoint Communications™, Brochure, "The Top 12 Benefits of Content Intelligence."

L. Peter Deutsch, "Deflate Compressed Data Format Specification," May 1996.

Antaeus Feldspar, Article, "An Explanation of the Deflate Algorithm," Sep. 11, 1997.

ArrowPoint Communications™ CDDCenter Vendor Listing, "ArrowPoint CS-50 Highlights" obtained at internet address http://www.cddcenter.com/arrowpoint.htm, May 21, 2000.

Peter Christy, Analyst Commentary, "When to Distribute Content—The Peters' Principles," obtained at internet address http://www.cddcenter.com/index.html, May 21, 2000.

Content Delivery 101: An Introduction to Content Distribution & Delivery.

CDDCenter, "How Do Caching and Content Delivery Really Differ?" obtained at internet address http://www.cddcenter.com/cachingvcontent.htm, pp. 1-4, May 21, 2000.

Internet Research Group "Infrastructure Application Service Providers," Feb. 2000, pp. 1-7.

Peter Christy, Internet Research Group, "Content Delivery Architectures: Why Doesn't One Size Fit All?" pp. 1-12.

Steven Vonder Haar, Inter@ctive Week, Feb. 14, 2000, "Content Delivery Shifts To Edge of Net," obtained at internet address http://www.zdnet.com/intweek/stories/news/0,4164,2436865,00.html, Dated May 22, 2000.

David Willis, Network Computing, "The Content-Delivery Edge," obtained at internet address http://www.networkcomputing.com/1103/1103colwillis.html, Dated May 22, 2000.

Phrack Magazine, "IP-spoofing Demystified (Trust-Relationship Exploitation)" vol. Seven, Issue Forty-Eight, File 14 of 18. pp. 1-9, obtained at internet address http://www.fc.net/phrack/files/p48/p48-14.html, Dated Jun. 5, 2000.

Eddie Mission, "What is Eddie?", obtained at internet address http://www.eddieware.org/what.html, Dated Apr. 21, 2000.

Cisco Enterprise Solutions, "Quality of Service," obtained at internet address http://www.cisco.com/warp/public/779/largeent/learn/technologies/qos/.

Cisco White Paper, "Delivering End-to-End Security in Policy-Based Networks," obtained at internet address, http://www.cisco.com/warp/public/cc/pd/nemnsw/cap/tech/deesp_wp.htm.

Technology Packeteer, obtained at internet address, http://www.packeteer.com/technology/index.cfm.

Overview Cisco Content Networking, obtained at internet address http://www.cisco.com/warp/public/cc/so/neso/ienesv/cxne/ccnov_ov.htm.

Overview Cisco Secure Policy Manager 2.0, obtained at internet address http://www.cisco.com/warp/public/cc/pd/sqsw/sqppmn/prodlit/secmn_ov.htm.

Alteon Web Systems, White Paper "Optimizing ISP Networks and Services with DNS Redirection," Aug. 1999.

Alteon Web Systems, White Paper "Virtual Matrix Architecture Scaling Web Services for Performance and Capacity," Apr. 2000.

Alteon Web Systems, White Paper, Questions and Answers, pp. 1-3.

3Com Technical Ppaers, Layer 3 Switching, May 1998.

Web Cache Communication Protocol Version 2, pp. C-1 to C-54.

RFC2267 Working Group- Denial of Service Counter Measures, Tele-conference Meeting Aug. 25, 2000, Moderator, Henry Teng of eBay.

Track-back Architecture General Requirements Version 0.1, Initial Draft submitted to Counter-DoS Solutions Working Group, Jul. 31, 2000, Edited by Bob Geiger, Recourse Technologies.

SwitchOn Networks, Inc., ClassiPI™ At-a-Glance.

C-Port™ A Motorola Company, C-5™ Digital Communications Processor, Product Brief, pp. 1-8, May 4, 2000.

Peder Jungck, "Building a Faster Cache Server" A Theoretical Whitepaper, Silicon Valley Internet Capital, pp. 1-19.

IXF1002 Dual Port Gigabit Ethernet MAC, Product Brief, Levon One™ an Intel Company.

NetLogic Microsystems Product Overview.

Agere, Inc. "The Challenge for Next Generation Network Processors", Sep. 10, 1999.

Phillips Semiconductors' VMS747 Security Processor Overview.

Cisco Systems, Cisco 12000 Series GSR, "Performing Internet Routing and Switching at Gigabit Speeds," obtained at internet address, http://www.cisco.com/warp/public/cc/pd/rt/12000/.

Cisco Systems, "Cisco 10000 Edge Service Router," obtained at internet address, http://www.cisco.com/warp/public/cc/pd/rt/10000/.

Nortel Networks™ "Passport 8600 Routing Switch," obtained at internet address, http://www.nortelnetworks.com/products/01/passport/8600/index.html.

Lucent Technologies, "InterNetworking Systems," obtained at internet address, http://www.lucent.com/ins/products/grf/.

Lucent Technologies, "InterNetworking Systems," obtained at internet address, http://www.lucent.com/ins/products/grf/grf1600.html.

Juniper Networks, "M20 Internet Backbone Router," Datasheet, obtained at internet address, http://www.juniper.net/products/dsheet/100009.html.

Juniper Networks, "M40 Internet Backbone Router," Datasheet, obtained at internet address, http://www.juniper.net/products/dsheet/100001.html.

Juniper Networks, Inc., "M160 Internet Backbone Router" Datasheet, obtained at internet address, http://www.juniper.net/products/dsheet/10012.

Rajeev Kumar, Intel Confidential, "IXP1200 Overview".

Intel "IXP1200 Network Processor," Datasheet, pp. 1-109 (out of 146 pages), May 2000.

Cisco 7500 Series Routers, pp. 1-2, obtained at internet address http://www.cisco.com/warp/public/cc/pd/rt/7500/.

JISC JTAP Report—Network Delivery; www.jtap.ac.uk/reports/pdf/jtap-036.pdf.

Proxy PNNI augmented routing (proxy PAR); 1st IEEE Internal Conference on, Jun. 22-24, 1998.

Client-Server Interactions in Multi-Server Operating Systems; Mark Stevenson (1994); ftp.cs.cuhk.hk/pub/mach3/src/mach_us/src/doc/us_client_server.ps.

Corpus-Based Learning of Compound Noun Indexing—Ung-Kwan Jee Hyub (2000) www.ai.mit.edu/people/jimmylin/papers/Kwak00.pdf.

The Role of Test Cases in Automated Knowledge Refinement—Palmer, Craw (1996) www.scms.rgu.ac.uk/publications/96/96_4.ps.qz.

The Policy Obstacle Course: The Realisation of Low-Level.. -Schema York July www.cs.york.ac.uk/~jdm/pubs.polobstc.ps.Z.

Data Filter Architecture Pattern Robert Flanders and Eduardo ..— Dept of Computer jerry.cs.uiuc.edu/~plop/plop99/proceedingd/Fernandez5/Flanders3.PDF.

* cited by examiner

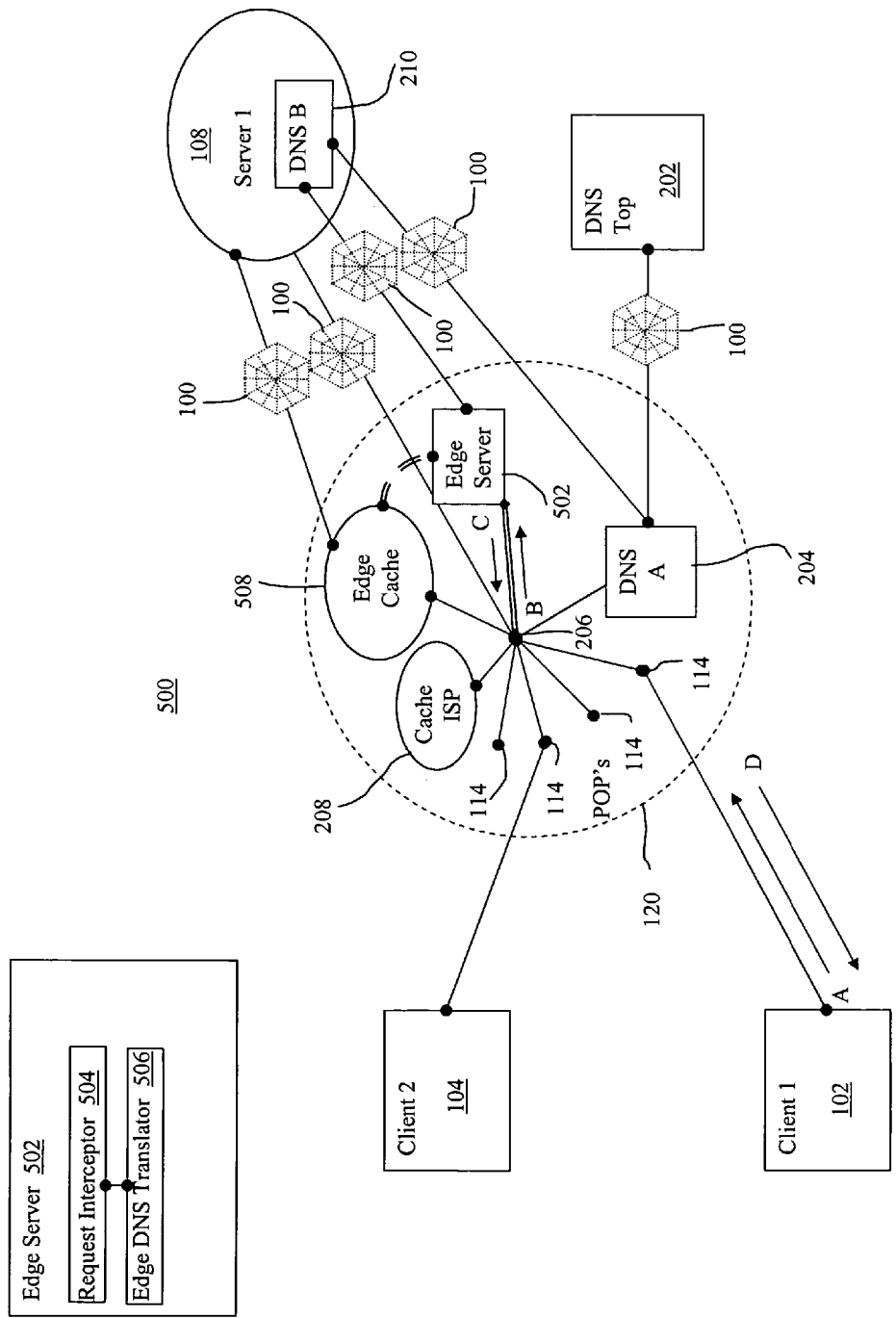

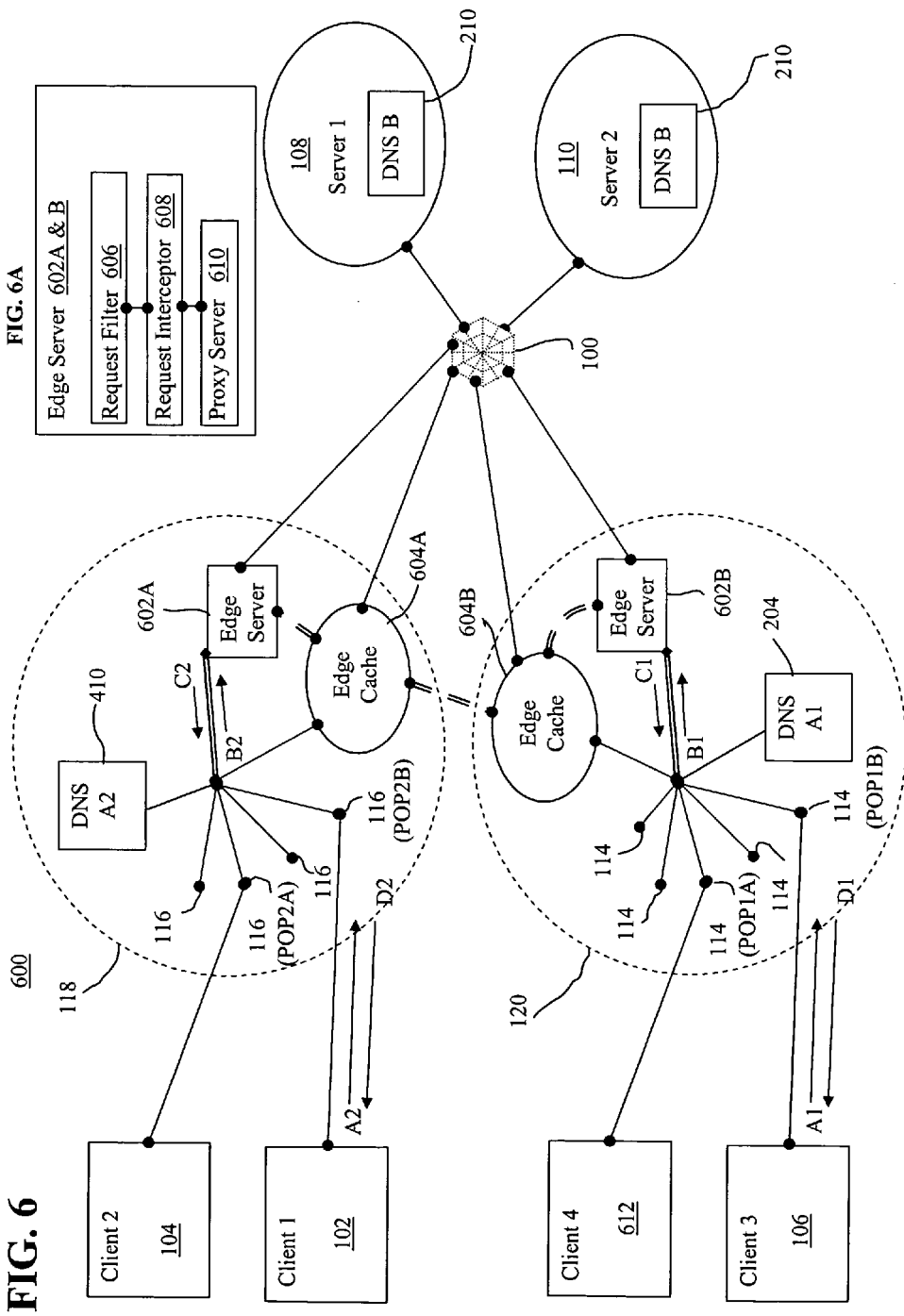

METHOD AND APPARATUS FOR FACILITATING CLIENT SERVER COMMUNICATIONS OVER A NETWORK

RELATED APPLICATIONS

This application is a continuation under 37 C.F.R. § 1.53(b) of U.S. patent application Ser. No. 09/602,129 filed Jun. 23, 2000 now U.S. Pat. No. 6,829,654, the entire disclosure of which is hereby incorporated by reference.

BACKGROUND

The Internet is growing by leaps and bounds. Everyday, more and more users log on to the Internet for the first time and these, and existing users are finding more and more content being made available to them. Whether it be for shopping, checking stock prices or communicating with friends, the Internet represents a universal medium for communications and commerce.

Unfortunately, the growing user base along with the growing content provider base is causing ever increasing congestion and strain on the infrastructure, the network hardware and software plus the communications links linking it all together, which makes up the Internet. While the acronym "WWW" is defined as "World Wide Web", many users of the Internet have come to refer to it as the "World Wide Wait."

These problems are not limited to the Internet either. Many companies provide internal networks, known as intranets, which are essentially private Internets for use by their employees. These intranets can become overloaded as well. Especially, when a company's intranet provides connectivity to the Internet. In this situation, the intranet is not only carrying internally generated traffic but also Internet traffic generated by the employees.

Furthermore, more and more malicious programmers are setting there sights on the Internet. These "hackers" spread virus programs or attempt to hack into Web sites in order to steal valuable information such as credit card numbers. Further, there have been an increasing number of Denial of Service attacks where a hacker infiltrates multiple innocent computers connected to the Internet and uses them, unwittingly, to bombard a particular Web site with an immense volume of traffic. This flood of traffic overwhelms the servers and literally shuts the Web site down.

Accordingly, there is a need for an enhanced Internet infrastructure to more efficiently deliver content from providers to users and provide additional network security and fault tolerance.

SUMMARY

The present invention is defined by the following claims, and nothing in this section should be taken as a limitation on those claims. By way of introduction, the preferred embodiments described below relate to an apparatus for facilitating communications between a client and a first server over a network, where the network comprises a first sub-network comprising the client. The apparatus comprises a request interceptor coupled with the first sub-network and operative to selectively intercept a first request generated by the client to the first server prior to receipt by the first server. The apparatus also includes a request transmitter operative to transmit the intercepted first request to the first server as if originated by the apparatus. In addition, the apparatus includes a response receiver operative to receive a response from the first server in response to the originated intercepted first request. In addition, the apparatus includes a response transmitter operative to transmit said response to said client. Finally, the apparatus includes a request filter coupled between the request interceptor and the request transmitter and operative to selectively filter the intercepted first request prior to the request transmitter acting on the request.

The preferred embodiments further relate to a method for facilitating communications between a client and a first server over a network where the network comprises a first sub-network comprising the client. The method comprises: intercepting, selectively, a first data transmission generated by the client to the first server prior to receipt by the first server; filtering the selectively intercepted first data transmission; originating the filtered selectively intercepted first data transmission to the first server; receiving a response from the first server in response to the originated filtered selectively intercepted first data transmission; and transmitting the response to the client.

BRIEF DESCRIPTION OF THE DRAWINGS

FIG. 5 depicts a content delivery system for use with the network of FIG. 1 according to a second embodiment.

FIG. 5A depicts a block diagram of the edge server of FIG. 5.

FIG. 6 depicts a content delivery system for use with the network of FIG. 1 according to a third embodiment.

FIG. 6A depicts a block diagram of the edge server of FIG. 6.

DETAILED DESCRIPTION OF THE PRESENTLY PREFERRED EMBODIMENTS

Figure 1:
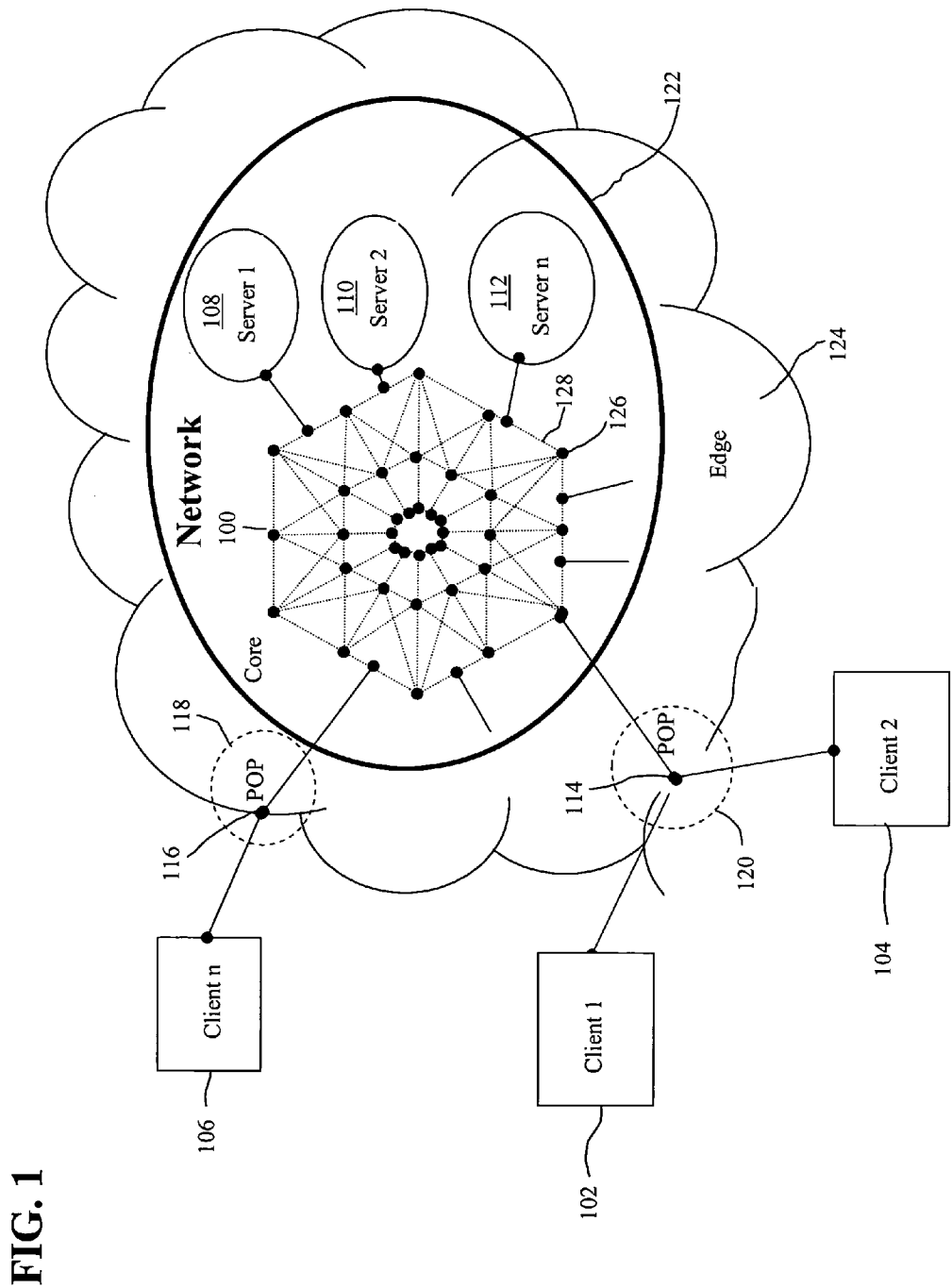
FIG. 1 depicts an exemplary network for use with the preferred embodiments.

Referring now to the figures, and in particular, FIG. 1, there is shown an exemplary network 100 for use with the presently preferred embodiments. It is preferred that the network 100 be a publicly accessible network, and in particular, the Internet. While, for the purposes of this disclosure, the disclosed embodiments will be described in relation to the Internet, one of ordinary skill in the art will appreciate that the disclosed embodiments are not limited to the Internet and are applicable to other types of public networks as well as private networks, and combinations thereof, and all such networks are contemplated.

I. Introduction

As an introduction, a network interconnects one or more computers so that they may communicate with one another, whether they are in the same room or building (such as a Local Area Network or LAN) or across the country from each other (such as a Wide Area Network or WAN). A network is series of points or nodes 126 interconnected by communications paths 128. Networks can interconnect with other networks and can contain sub-networks. A node 126 is a connection point, either a redistribution point or an end point, for data transmissions generated between the computers which are connected to the network. In general, a node 126 has a programmed or engineered capability to recognize and process or forward transmissions to other nodes 126. The nodes 126 can be computer workstations, servers, bridges or other devices but typically, these nodes 126 are routers.

A router is a device or, in some cases, software in a computer, that determines the next network node 126 to which a piece of data (also referred to as a "packet" in the Internet context) should be forwarded toward its destination. The router is connected to at least two networks or sub-networks and decides which way to send each information packet based on its current understanding of the state of the networks it is connected to. A router is located at any juncture of two networks, sub-networks or gateways, including each Internet point-of-presence (described in more detail below). A router is often included as part of a network switch. A router typically creates or maintains a table of the available routes and their conditions and uses this information along with distance and cost algorithms to determine the best route for a given packet. Typically, a packet may travel through a number of network points, each containing additional routers, before arriving at its destination.

The communications paths 128 of a network 100, such as the Internet, can be coaxial cable, fiber optic cable, telephone cable, leased telephone lines such as T1 lines, satellite links, microwave links or other communications technology as is known in the art. The hardware and software which allows the network to function is known as the "infrastructure." A network 100 can also be characterized by the type of data it carries (voice, data, or both) or by the network protocol used to facilitate communications over the network's 100 physical infrastructure.

The Internet, in particular, is a publicly accessible worldwide network 100 which primarily uses the Transport Control Protocol and Internet Protocol ("TCP/IP") to permit the exchange of information. At a higher level, the Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet for the collaborative sharing and distribution of information. It will be appreciated that the disclosed embodiments are applicable to many different applications protocols both now and later developed.

Logically, the Internet can be thought of as a Web of intermediate network nodes 126 and communications paths 128 interconnecting those network nodes 126 which provide multiple data transmission routes from any given point to any other given point on the network 100 (i.e. between any two computers connected to the network). Physically, the Internet can also be thought of as a collection of interconnected subnetworks wherein each sub-network contains a portion of the intermediate network nodes 126 and communications paths 128. The division of the Internet into sub-networks is typically geographically based, but can also be based on other factors such as resource limitations and resource demands. For example, a particular city may be serviced by one or more Internet sub-networks provided and maintained by competing Internet Service Providers ("ISP's") (discussed in more detail below) to support the service and bandwidth demands of the residents.

Contrasting the Internet with an intranet, an intranet is a private network contained within an enterprise, such as a corporation, which uses the TCP/IP and other Internet protocols, such as the World Wide Web, to facilitate communications and enhance the business concern. An intranet may contain its own Domain Name Server ("DNS") (described in more detail below) and may be connected to the Internet via a gateway, i.e., an intra-network connection, or gateway in combination with a proxy server (described in more detail below) or firewall, as are known in the art.

Referring back to FIG. 1, clients 102, 104, 106 and servers 108, 110, 112 are shown coupled with the network 100. Herein, the phrase "coupled with" is defined to mean directly connected to or indirectly connected with through one or more intermediate components. Such intermediate components may include both hardware and software based components. The network 100 facilitates communications and interaction between one or more of the clients 102, 104, 106 and one or more of the servers 108, 110, 112 (described in more detail below). Alternatively, the network 100 also facilitates communications and interaction among one or more of the clients 102, 104, 106, e.g. between one client 102, 104, 106 and another client 102, 104, 106 or among one or more of the servers 108, 110, 112, e.g. between one server 108, 110, 112 and another server 108, 110, 112.

A client 102, 104, 106 may include a personal computer workstation, mobile or otherwise, wireless device such as a personal digital assistant or cellular telephone, an enterprise scale computing platform such as a mainframe computer or server or may include an entire intranet or other private network which is coupled with the network 100. Typically, a client 102, 104, 106 initiates data interchanges with other computers, such as servers 108, 110, 112 coupled with the network 100. These data interchanges most often involve the client requesting data or content from the other computer and the other computer providing that data or content in response to the request. Alternatively, the other computer coupled with the network can "push" data or content to the client 102, 104, 106 without it first being requested. For example, an electronic mail server 108, 110, 112 may automatically push newly received electronic mail over the network 100 to the client 102, 104, 106 as the new electronic mail arrives, alleviating the client 102, 104, 106 from first requesting that new mail be sent. It will be apparent to one of ordinary skill in the art that there can be many clients 102, 104, 106 coupled with the network 100.

A server 108, 110, 112 may include a personal computer workstation, an enterprise scale computing platform or other computer system as are known in the art. A server 108, 110, 112 typically responds to requests from clients 102, 104, 106 over the network 100. In response to the request, the server 108, 110, 112 provides the requested data or content to the client 102, 104, 106 which may or may not require some sort of processing by the server 108, 110, 112 or another computer to produce the requested response. It will be apparent to one of ordinary skill in the art that a client 102, 104, 106 may also be a server 108, 110, 112 and vice versa depending upon the nature of the data interchange taking place. For purposes of this disclosure, a client 102, 104, 106 requests or receives content and is separate from a server 108, 110, 112 which provides content (whether requested or not, i.e. pushed). Preferably, servers 108, 110, 112 are World Wide Web servers serving Web pages and/or Web content to the clients 102, 104, 106 (described in more detail below). It will be apparent to one of ordinary skill in the art that there can be many servers 108, 110, 112 coupled with the network 100.

Clients 102, 104, 106 are each coupled with the network 100 at a point of presence ("POP") 114, 116. The POP 114, 116 is the connecting point which separates the client 102, 104, 106 from the network 100. In a public network 100, such as the Internet, the POP 114, 116 is the logical (and possibly physical) point where the public network 100 ends, after which comes the private hardware or private network of the client 102, 104, 106. A POP 114, 116 is typically provided by a service provider 118, 120, such as an Internet Service Provider ("ISP") 118, 120, which provides connectivity to the network 100 on a fee for service basis. A POP 114, 116 may actually reside in rented space owned by telecommunications carrier such as AT&T or Sprint to which the ISP 118, 120 is connected. A POP 114, 116 may be coupled with routers, digital/analog call aggregators, servers 108, 110, 112, and frequently frame relay or ATM switches. As will be discussed below, a POP 114, 116 may also contain cache servers and other content delivery devices.

A typical ISP 118, 120 may provide multiple POP's 114, 116 to simultaneously support many different clients 102, 104, 106 connecting with the network 100 at any given time. A POP 114, 116 is typically implemented as a piece of hardware such as a modem or router but may also include software and/or other hardware such as computer hardware to couple the client 102, 104, 106 with the network 100 both physically/electrically and logically (as will be discussed below). The client 102, 104, 106 connects to the POP 114,116 over a telephone line or other transient or dedicated connection. For example, where a client 102, 104, 106 is a personal computer workstation with a modem, the ISP 118, 120 provides a modem as the POP 114, 116 to which the client 102, 104, 106 can dial in and connect to via a standard telephone line. Where the client 102, 104, 106 is a private intranet, the POP 114, 116 may include a gateway router which is connected to an internal gateway router within the client 102, 104, 106 by a high speed dedicated communication link such as T1 line or a fiber optic cable.

A service provider 118, 120 will generally provide POP's 114, 116 which are geographically proximate to the clients 102, 104, 106 being serviced. For dial up clients 102, 104, 106, this means that the telephone calls can be local calls. For any client 102, 104, 106, a POP which is geographically proximate typically results in a faster and more reliable connection with the network 100. Servers 108, 110, 112 are also connected to the network 100 by POP's 114, 116. These POP's 114, 116 typically provide a dedicated, higher capacity and more reliable connection to facilitate the data transfer and availability needs of the server 108, 110, 112. Where a client 102, 104, 106 is a wireless device, the service provider 118, 120 may provide many geographically dispersed POP's 114, 116 to facilitate connecting with the network 100 from wherever the client 102, 104, 106 may roam or alternatively have agreements with other service providers 118, 120 to allow access by each other's customers. Each service provider 118, 120, along with its POP's 114, 116 and the clients 102, 104, 106 effectively forms a sub-network of the network 100.

Note that there may be other service providers 118, 120 "upstream" which provide network 100 connectivity to the service providers 118, 120 which provide the POP's 114, 116. Each upstream service provider 118, 120 along with its downstream service providers 118, 120 again forms a sub-network of the network 100. Peering is the term used to describe the arrangement of traffic exchange between Internet service providers (ISPs) 118, 120. Generally, peering is the agreement to interconnect and exchange routing information. More specifically, larger ISP's 118, 120 with their own backbone networks (high speed, high capacity network connections which interconnect sub-networks located in disparate geographic regions) agree to allow traffic from other large ISP's 118, 120 in exchange for traffic on their backbones. They also exchange traffic with smaller service providers 118, 120 so that they can reach regional end points where the POP's 114, 116 are located. Essentially, this is how a number of individual sub-network owners compose the Internet. To do this, network owners and service providers 118, 120, work out agreements to carry each other's network traffic. Peering requires the exchange and updating of router information between the peered ISP's 118, 120, typically using the Border Gateway Protocol (BGP). Peering parties interconnect at network focal points such as the network access points (NAPs) in the United States and at regional switching points. Private peering is peering between parties that are bypassing part of the publicly accessible backbone network through which most Internet traffic passes. In a regional area, some service providers 118, 120 have local peering arrangements instead of, or in addition to, peering with a backbone service provider 118, 120.

A network access point (NAP) is one of several major Internet interconnection points that serve to tie all of the service providers 118, 120 together so that, for example, an AT&T user in Portland, Oreg. can reach the Web site of a Bell South customer in Miami, Fla. The NAPs provide major switching facilities that serve the public in general. Service providers 118, 120 apply to use the NAP facilities and make their own inter-company peering arrangements. Much Internet traffic is handled without involving NAPs, using peering arrangements and interconnections within geographic regions.

For purposes of later discussions, the network 100 can be further logically described to comprise a core 122 and an edge 124. The core 122 of the network 100 includes the servers 108, 110, 112 and the bulk of the network 100 infrastructure, as described above, including larger upstream service providers 118, 120, and backbone communications links, etc. Effectively, the core 122 includes everything within the network 100 up to the POP's 114, 116. The POP's 114, 116 and their associated hardware lie at the edge 124 of the network 100. The edge 124 of the network 100 is the point where clients 102, 104, 106, whether single devices, computer workstations or entire corporate internal networks, couple with the network 100. As defined herein, the edge 124 of the network 100 may include additional hardware and software such as Domain Name Servers, cache servers, proxy servers and reverse proxy servers as will be described in more detail below. Typically, as the network 100 spreads out from the core 122 to the edge 124, the total available bandwidth of the network 100 is diluted over more and more lower cost and lower bandwidth communications paths. At the core 122, bandwidth over the higher capacity backbone interconnections tends to be more costly than bandwidth at the edge 124 of the network 100. As with all economies of scale, high bandwidth interconnections are more difficult to implement and therefore rarer and more expensive than low bandwidth connections. It will be appreciated, that even as technology progresses, newer and higher bandwidth technologies will remain more costly than lower bandwidth technologies.

II. The World Wide Web

As was discussed above, clients 102, 104, 106 engage in data interchanges with servers 108, 110, 112. On the Internet, these data exchanges typically involve the World Wide Web ("WWW"). Relative to the TCP/IP suite of protocols (which are the basis for information exchange on the Internet), HTTP is an application protocol. A technical definition of the World Wide Web is all the resources and users on the Internet that are using the Hypertext Transfer Protocol ("HTTP"). HTTP is the set of rules for exchanging data in the form of files (text, graphic images, audio, video, and other multimedia files, such as streaming media and instant messaging), also known as Web content, between clients 102, 104, 106 and servers 108, 110, 112. Servers 108, 110, 112 which serve Web content are also known as Web servers 108, 110, 112.

Essential concepts that are part of HTTP include (as its name implies) the idea that files/content can contain references to other files/content whose selection will elicit additional transfer requests. Any Web server 108, 110, 112 contains, in addition to the files it can serve, an HTTP daemon, a program that is designed to wait for HTTP requests and handle them when they arrive. A personal computer Web browser program, such as Microsoft™ Internet Explorer, is an HTTP client program (a program which runs on the client 102, 104, 106), sending requests to Web servers 108, 110, 112. When the browser user enters file requests by either "opening" a Web file (typing in a Uniform Resource Locator or URL) or clicking on a hypertext link, the browser builds an HTTP request and sends it to the Web server 108, 110, 112 indicated by the URL. The HTTP daemon in the destination server 108, 110, 112 receives the request and, after any necessary processing, returns the requested file to the client 102, 104, 106.

The Web content which a Web server typically serves is in the form of Web pages which consist primarily of Hypertext Markup Language. Hypertext Markup Language ("HTML") is the set of "markup" symbols or codes inserted in a file intended for display on a World Wide Web browser. The markup tells the Web browser how to display a Web page's words and images, as well as other content, for the user. The individual markup codes are referred to as elements or tags. Web pages can further include references to other files which are stored separately from the HTML code, such as image or other multimedia files to be displayed in conjunction with the HTML Web content.

A Web site is a related collection of Web files/pages that includes a beginning HTML file called a home page. A company or an individual tells someone how to get to their Web site by giving that person the address or domain name of their home page (the addressing scheme of the Internet and the TCP/IP protocol is described in more detail below). From the home page, links are typically provided to all the other pages (HTML files) located on their site. For example, the Web site for IBM™ has the home page address of http://www.ibm.com. Alternatively, the home page address may include a specific file name like index.html but, as in IBM's case, when a standard default name is set up, users don't have to enter the file name. IBM's home page address leads to thousands of pages. (But a Web site can also be just a few pages.)

Since site implies a geographic place, a Web site can be confused with a Web server 108, 110, 112. As was discussed above, a server 108, 110, 112 is a computer that holds and serves the HTML files, images and other data for one or more Web sites. A very large Web site may be spread over a number of servers 108, 110, 112 in different geographic locations or one server 108, 110, 112 may support many Web sites. For example, a Web hosting company may provide server 108, 110, 112 facilities to a number of Web sites for a fee. Multiple Web sites can cross-link to files on other Web sites or even share the same files.

III. The Domain Name System

As was described above, the network 100 facilitates communications between clients 102, 104, 106 and servers 108, 110, 112. More specifically, the network 100 facilitates the transmission of HTTP requests from a client 102, 104, 106 to a server 108, 110, 112 and the transmission of the server's 108, 110, 112, response to that request, the requested content, back to the client 102, 104, 106. In order to accomplish this, each device coupled with the network 100, whether it be a client 102, 104, 106 or a server 108, 110, 112 must provide a unique identifier so that communications can be routed to the correct destination. On the Internet, these unique identifiers comprise domain names (which generally will include World Wide Web Uniform Resource Locators or "URL's") and Internet Protocol addresses or "IP" addresses. Every client 102, 104, 106 and every server 108, 110, 112 must have a unique domain name and IP address so that the network 100 can reliably route communications to it. Additionally, clients 102, 104, 106 and servers 108, 110, 112 can be coupled with proxy servers (forward, reverse or transparent), discussed in more detail below, which allow multiple clients 102, 104, 106 or multiple servers 108, 110, 112 to be associated with a single domain name or a single IP address. In addition, a particular server 108, 110, 112 may be associated with multiple domain names and/or IP addresses for more efficient handling of requests or to handle multiple content providers, e.g. multiple Web sites, on the same server 108, 110, 112. Further, as was discussed above, since a POP 114, 116 provides the connecting point for any particular client 102, 104, 106 to connect to the network 100, it is often satisfactory to provide each POP 114, 116 with a unique domain name and IP address since the POP 114, 116 will reliably deliver any communications received by it to its connected client 102, 104, 106. Where the client 102, 104, 106 is a private network, it may have its own internal hardware, software and addressing scheme (which may also include domain names and IP addresses) to reliably deliver data received from the POP 114, 116 to the ultimate destination within the private network client 102, 104, 106.

As was discussed, the Internet is a collection of interconnected sub-networks whose users communicate with each other. Each communication carries the address of the source and destination sub-networks and the particular machine within the sub-network associated with the user or host computer at each end. This address is called the IP address (Internet Protocol address). In the current implementation of the Internet, the IP address is a 32 bit binary number divided into four 8 bit octets. This 32-bit IP address has two parts: one part identifies the source or destination sub-network (with the network number) and the other part identifies the specific machine or host within the source or destination sub-network (with the host number). An organization can use some of the bits in the machine or host part of the address to identify a specific sub-network within the sub-network. Effectively, the IP address then contains three parts: the sub-network number, an additional sub-network number, and the machine number.

One problem with IP addresses is that they have very little meaning to ordinary users/human beings. In order to provide an easier to use, more user friendly network 100, a symbolic addressing scheme operates in parallel with the IP addressing scheme. Under this symbolic addressing scheme, each client 102, 104, 106 and server 108, 110, 112 is also given a "domain name" and further, individual resources, content or data are given a Uniform Resource Locator ("URL") based on the domain name of the server 108, 110, 112 on which it is stored. Domain names and URL's are human comprehensible text and/or numeric strings which have symbolic meaning to the user. For example, a company may have a domain name for its servers 108, 110, 112 which is the company name, i.e., IBM Corporation's domain name is ibm.com. Domain names are further used to identify the type of organization to which the domain name belongs. These are called "top-level" domain names and include com, edu, org, mil, gov, etc. Corn indicates a corporate entity, edu indicates an educational institution, mil indicates a military entity, and gov indicates a government entity. It will be apparent to one of ordinary skill in the art that the text strings which make up domain names may be arbitrary and that they are designed to have relevant symbolic meaning to the users of the network 100. A URL typically includes the domain name of the provider of the identified resource, an indicator of the type of resource and an identifier of the resource itself. For example, for the URL "http://www.ibm.com/index.html", http identifies this resource as a hypertext transfer protocol compatible resource, www.ibm.com is the domain name (again, the www is arbitrary and typically is added to indicate to a user that the server 108, 110, 112, associated with this domain name is a world wide Web server), and index.html identifies a hypertext markup language file named "index.html" which is stored on the identified server 108, 110, 112.

Domain names make the network 100 easier for human beings to utilize it, however the network infrastructure ultimately uses IP addresses, and not domain names, to route data to the correct destination. Therefore, a translation system is provided by the network 100 to translate the symbolic human comprehensible domain names into IP addresses which can then be used to route the communications. The Domain Name System ("DNS") is the way that Internet domain names are located and translated into IP addresses. The DNS is a distributed translation system of address translators whose primary function is to translate domain names into IP addresses and vice versa. Due to the ever expanding number of potential clients 102, 104, 106 and servers 108, 110, 112 coupled with the network 100 (currently numbering in the millions), maintaining a central list of domain name/IP address correspondences would be impractical. Therefore, the lists of domain names and corresponding IP addresses are distributed throughout the Internet in a hierarchy of authority. A DNS server, typically located within close geographic proximity to a service provider 118, 120 (and likely provided by that service provider 118, 120), handles requests to translate the domain names serviced by that service provider 118, 120 or forwards those requests to other DNS servers coupled with the Internet for translation.

DNS translations (also known as "lookups" or "resolutions") can be forward or reverse. Forward DNS translation uses an Internet domain name to find an IP address. Reverse DNS translation uses an Internet IP address to find a domain name. When a user enters the address or URL for a Web site or other resource into their browser program, the address is transmitted to a nearby router which does a forward DNS translation in a routing table to locate the IP address. Forward DNS translations are the more common translation since most users think in terms of domain names rather than IP addresses. However, occasionally a user may see a Web page with a URL in which the domain name part is expressed as an IP address (sometimes called a dot address) and wants to be able to see its domain name, to for example, attempt to figure the identity of who is providing the particular resource. To accomplish this, the user would perform a reverse DNS translation.

The DNS translation servers provided on the Internet form a hierarchy through which any domain name can be "resolved" into an IP address. If a particular DNS translation server does not "know" the corresponding IP address of a given domain name, it "knows" other DNS translation servers it can "ask" to get that translation. This hierarchy includes "top-level" DNS translation servers which "know" which resources (clients 102, 104, 106 or servers 108, 110, 112) have a particular top level domain identifier, i.e. com, gov, edu, etc. as described above. This hierarchy further continues all the way up to the actual resource (client 102, 104, 106 or server 108, 110, 112) which is typically affiliated with a DNS translation server which "knows" about it and its IP address. A particular DNS translation server "knows" of a translation when it exists in its table of translations and has not expired. Any particular translation will typically be associated with a Time to Live ("TTL") which specifies a duration, time or date after which the translation expires. As discussed, for a given translation, if a DNS translation server does not know the translation, because it is not in its routing table or it has expired, that DNS translation server will have to inquire up the hierarchical chain of DNS translation servers in order to make the translation. In this way, new domain name and IP address translations can be propagated through the DNS translation server hierarchy as new resources are added and old resources are assigned new addresses.

Figure 2:
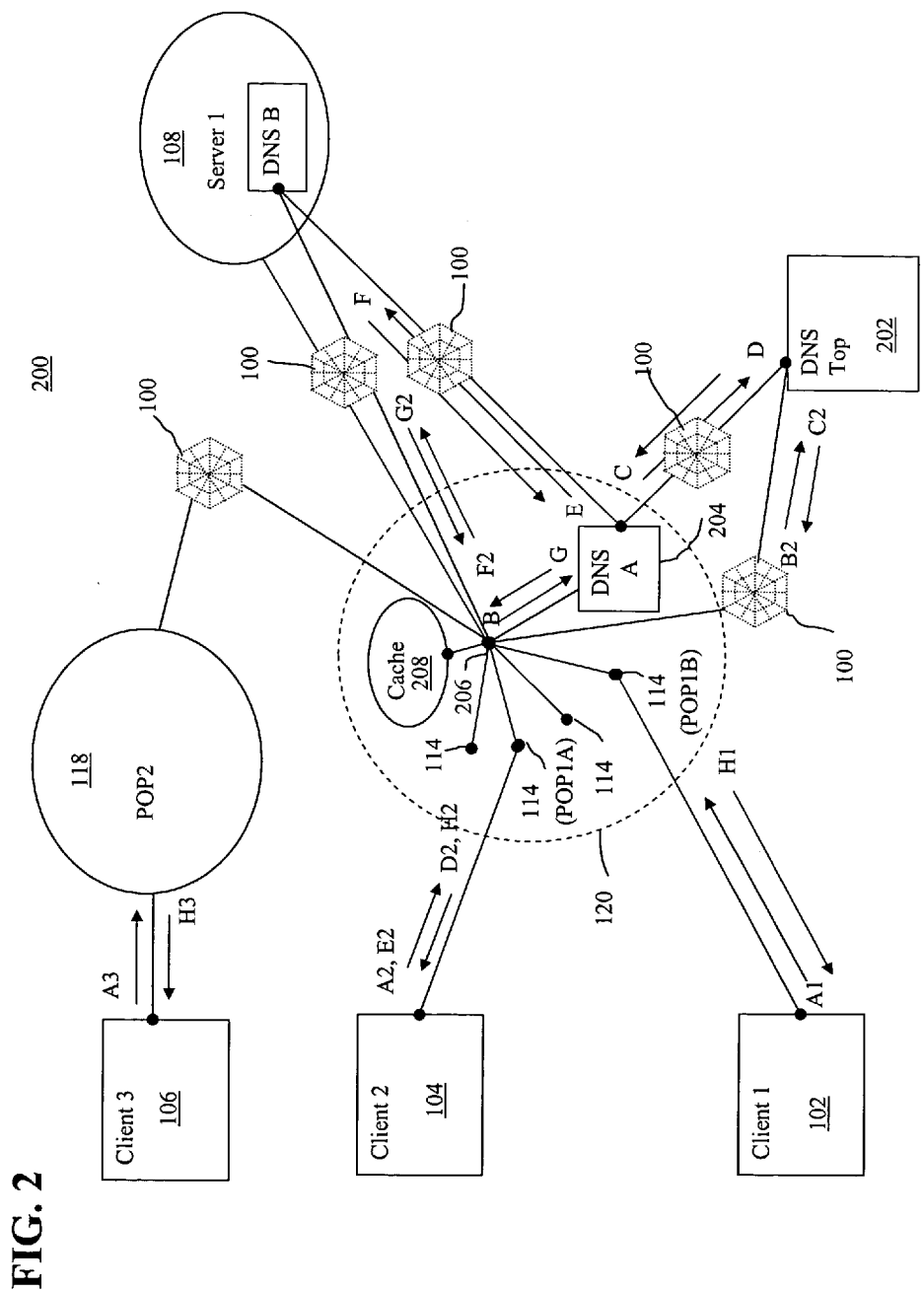
FIG. 2 depicts the operations of the Domain Name System of the exemplary network of FIG. 1.

Referring now to FIG. 2, there is shown a diagram illustrating the basic operation of the Domain Name System 200. Depicted in the figure are clients 102, 104, 106, labeled "Client 1", "Client 2" and "Client 3." Clients 1 and 2 are coupled with POP's 114 provided by service provider 120, labeled "POP1A" and "POP1B." Client 3 is coupled with a POP (not shown) provided by service provider 118, labeled "POP2." In addition, service providers 118, 120 may provide additional POP's 114 for other clients 102, 104, 106 as described above. Service provider 120 is shown further coupled with service provider 118, a server 108, labeled "Server 1", preferably a Web server and more preferably an entire Web site which may comprise multiple sub-servers (not shown) as discussed above, and a top-level DNS translation server 202, labeled "DNS Top", all via the network 100 which is preferably the Internet. Furthermore, service provider 120 further includes a DNS translation server 204, labeled "DNS A" and routing and interconnection hardware 206, as described above, to electrically and logically couple the POP's 114 with the network 100. Optionally, the service provider 120 may also include a cache server 208 or proxy server (not shown) to enhance content delivery as described below.

In order for a client 102, 104, 106 to generate a request for content to a particular server 108, the client 102, 104, 106 first determines the IP address of the server 108 so that it can properly address its request. Referring to Client 1 102, an exemplary DNS translation transaction where the client 102, 104, 106 is a single workstation computer is depicted. A user of Client 1 enters a URL or domain name of the Server 1 108 and specific resource contained within Server 1, such as a sub-server, into their browser program in order to make a request for content. The browser program typically handles negotiating the DNS translation transaction and typically has been pre-programmed ("bound") with the IP address of a particular DNS translation server to go to first in order to translate a given domain name. Typically, this bound DNS translation server will be DNS A 204 provided by the service provider 120. Alternatively, where the client 102, 104, 106 is not bound to a particular DNS translation server, the service provider 120 can automatically route translation requests received by its POP's 114 to its DNS translation server, DNS A 202. The process by which a domain name is translated is often referred to as the "slow start" DNS translation protocol. This is in contrast to what is known as the "slow start HTTP" protocol which will be discussed below in more detail in relation to content delivery.

Client 1 102 then sends its translation request, labeled as "A1", to its POP 114, POP1A. The request, A1, is addressed with a return address of Client 1 and with the IP address of the bound DNS A 204 therefore the service provider's 120 routing equipment 206 automatically routes the request to DNS A 204, labeled as "B." Assuming DNS A 204 does not know how to translate the given domain name in the request or the translation in its routing table has expired, it must go up the DNS hierarchy to complete the translation. DNS A 204 will then forward a request, labeled "C", upstream to the top-level DNS translation server 202 associated with the top-level domain in the domain address, i.e. com, gov, edu etc. DNS A 204 has been pre-programmed with the IP addresses of the various hierarchical servers that it may need to talk to in order to complete a translation. DNS A 204 addresses request C with the IP address of the top-level DNS server 202 and also includes its own return address. DNA then transmits the request over the network 100 which routes the request to the top level DNS server 202. The top-level DNS server 202 will then translate and return the IP address corresponding to Server 1 108 back to DNS A 204 via the network 100, labeled "D."

As was discussed above, a particular domain name may be associated with multiple IP addresses of multiple sub-servers 108, 110, 112, as in the case of a Web site which, due to its size, must be stored across multiple sub-servers 108, 110, 112. Therefore, in order to identify the exact sub-server which can satisfy the request of the Client 1 102, DNS A 204 must further translate the domain address into the specific sub-server 108. In order to accomplish this, Server 1 108 provides its own DNS translation server 210 which knows about the various sub-servers and other resources contained within Server 1 108. DNS A 204, now knowing the IP address of Server 1 108, e.g. the Web site generally, can create a request, labeled "E", to translate the domain name/URL provided by Client 1 102 into the exact sub-server/resource on Server 1 108. DNS B 210 returns the translation, labeled "F", to DNS A 204 which then returns it to Client 1 102 via the service provider's routing equipment 206, labeled "G", which routes the response through POP1A 114 to the Client 1, labeled "H1." Client 1 102 now has the IP address it needs to formulate its content requests to Server 1 108.

FIG. 2, further depicts an exemplary DNS translation transaction wherein the client 102, 104, 106 is a private network such as an intranet. For example, client 2 104 may comprise its own network of computer systems. Further more, client 2 104 may provide its own DNS translation server (not shown) to handle internal routing of data as well as the routing of data over the network 100 generally for the computer systems coupled with this private network. In this case, the internal DNS translation server will either be programmed to send its unknown translations to DNS A (labeled as "A2", "B", "C", "D", "E", "F", "G", "H2") or may be programmed to use the DNS hierarchy itself, i.e. communicate directly with the upstream DNS Top 202 and DNS B 210 (labeled as "A2", "B2", "C2", "D2", "E2", "F2", "G2", "H2"). In these cases, the internal DNS translation server simply adds another layer to the DNS hierarchy as a whole, but the system continues to function similarly as described above.

In addition, FIG. 2, further depicts an exemplary DNS translation transaction wherein the client 102, 104, 106 is coupled with a POP 114 that is not associated with its bound DNS translation server 204. For example, Client 3 106 is depicted as being coupled with POP2 provided by service provider 118. In the exemplary situation, Client 3 106 is bound with DNS A 204 provided by service provider 120. This situation can occur in the wireless environment, where a particular wireless client 102, 104, 106 couples with whatever POP 114, 116 is available in its geographic proximity (e.g. when roaming) and is affiliated, e.g. has access sharing agreements, with the service provider 120 who generally provides connectivity services for the client 102, 104, 106. In this case, client 3 106 will perform its translation requests as described above, and will address these requests to its bound DNS Server, in this case DNS A 204. The service provider 118 will see the address of the DNS A 204 in client 3's 106 translation requests and appropriately route the translation request over the network 100 to service provider 120 and ultimately on to DNS A 204. DNS A 204 will appropriately handle the request and return it via the network 100 accordingly (labeled as "A3", "B", "C", "D", "E", "F", "G", "H3").

It will be appreciated that in each of the examples given above, if a particular DNS translation server already "knows" the requested translation, the DNS translation server does not have to go up the hierarchy and can immediately return the translation to the requester, either the client 102, 104, 106 or downstream DNS translation server.

It should be noted, that because a given server 108, 110, 112 may comprise multiple IP addresses, the DNS translation servers may be programmed to return a list of IP addresses in response to a given domain name translation request. Typically, this list will be ordered from the most optimal IP address to the least optimal IP address. The browser program can then pick one of the IP addresses to send content requests to and automatically switch to another IP address should the first requests fail to reach the destination server 108, 110, 112 due to a hardware failure or network 100 congestion. It will further be appreciated that the operations and structure of the existing DNS system are known to those of ordinary skill in the art.

IV. Content Delivery

As mentioned above, once the DNS translation is complete, the client 102, 104, 106 can initiate its requests for content from the server 108. Typically, the requests for content will be in the form of HTTP requests for Web content as described above. In order to alleviate server 108 overload, the HTTP protocol provides a "slow start" mechanism. As was described above, a Web page consists of HTML code plus images, multimedia or other separately stored content. Typically, the amount of HTML code contained within a Web page is very small compared to the amount of image and/or multimedia data. When a client requests a Web page from the server 108, the server 108 must serve the HTML code and the associated image/multimedia data to the client 102, 104, 106. However, the client 102, 104, 106, upon receipt of the HTML code, may decide, for whatever reason, that it does not want the associated image/multimedia data. To prevent the server 108 from wasting processing and bandwidth resources unnecessarily by sending unwanted data, the HTTP slow start protocol forces the client 102, 104, 106 to first request the HTML code and then subsequent to receipt of that HTML code, request any associated separately stored content. In this way, if after the initial request, the client 102, 104, 106 disconnects or otherwise switches to making requests of another server 108, the initial server 108 is not burdened with serving the unwanted or unnecessary content.

In addition, it important to note that clients 102, 104, 106 may be located very far from each other, either geographically or even logically in consideration of the network topology. For example, a client 102, 104, 106 may be located in Chicago, Ill. while the server 108 from which it is requesting content is located in Paris, France. Alternatively, client 102, 104, 106 may be located in the same city as server 108 but, due to the topology of the network 100, there may be multiple nodes 126 and interconnecting communications paths 128 between the client 102, 104, 106 and the server 108 necessitating a lengthy route for any data transmitted between the two. Either scenario can significantly impact the response time of a server 108 to a given request from a client 102, 104, 106. Adding in the fact that the network 100 may be servicing millions of clients 102, 104, 106 and servers 108 at any given time, the response time may be further impacted by reduced bandwidth and capacity caused by network congestion at the server 108 or at one or more intermediate network nodes 126.

Servers 108 and service providers 118, 120 may attempt to alleviate this problem by increasing the speed and bandwidth capacity of the network 100 interconnections. Further, servers 108 may attempt to alleviate slow request response times by providing multiple sub-servers which can handle the volume of requests received with minimal latency. These sub-servers can be provided behind a reverse proxy server which, as described above, is "tightly coupled" with the Web site and can route content requests directed to a single IP address, to any of the multiple sub-servers. This reduces the number of individual translations that have to be made available to the DNS translation system and kept up to date for all of the sub-servers. The reverse proxy server can also attempt to balance the load across multiple sub-servers by allocating incoming requests using, for example, a round-robin routine. Reverse proxy servers can further include a cache server as described below to further enhance the Server's 108 ability to handle a high volume of requests or the serving of large volumes of data in response to any given request. It will be appreciated that reverse proxy servers and load balancing techniques are generally known to those of ordinary skill in the art.

Clients 102, 104, 106 and service providers 118, 120 (and, as described above, servers 108) may attempt to alleviate this problem by including a cache or cache server 208. A cache server 208 is a server computer (or alternatively implemented in software directly on the client 102, 104, 106 or another computer coupled with the client 102, 104, 106 such as at the POP 114) located, both logically and geographically, relatively close to the client 102, 104, 106. The cache server 208 saves/caches Web pages and other content that clients 102, 104, 106, who share the cache server, have requested in the past. Successive requests for the same content can then be satisfied by the cache server 208 itself without the need to contact the source of the content. A cache server 208 reduces the latency of fulfilling requests and also reduces the load on the content source. Further, a cache server 208 at the edge 124 of the Internet reduces the consumption of bandwidth at the core 122 of the Internet where it is more expensive. The cache server 208 may be a part of a proxy server or may be provided by a service provider 118, 120.

Cache servers 208 invisibly intercept requests for content and attempt to provide the requested content from the cache (also known as a "hit"). Note that a cache server 208 is not necessarily invisible, especially when coupled with a proxy server. In this case, the client 102, 104, 106 may need to be specially programmed to communicate its content requests to the proxy server in order to utilize the cache server. Cache servers 208, as referred to in this disclosure then, may include these visible cache servers as well as invisible cache servers which transparently intercept and attempt to service content requests. Where the requested content is not in the cache (also known as a "miss"), the cache forwards the request onto the content source. When the source responds to the request by sending the content to the client 102, 104, 106, the cache server 208 saves a copy of the content in its cache for later requests. In the case where a cache server is part of a proxy server, the cache/proxy server makes the request to the source on behalf of the client 102, 104, 106. The source then provides the content to the cache/proxy server which caches the content and also forwards the requested content to the client 102, 104, 106. An exemplary software based cache server is provided by SQUID, a program that caches Web and other Internet content in a UNIX-based proxy server closer to the user than the content-originating site. SQUID is provided as open source software and can be used under the GNU license for free software, as is known in the art.

Caches operate on two principles, temporal locality and spatial locality. Temporal locality is a theory of cache operation which holds that data recently requested will most likely be requested again. This theory dictates that a cache should store only the most recent data that has been requested and older data can be eliminated from the cache. Spatial Locality is a theory of cache operation which holds that data located near requested data (e.g. logically or sequentially) will be likely to be requested next. This theory dictates that a cache should fetch and store data in and around the requested data in addition to the requested data. In practice, this means that when a HTML Web page is requested, the cache should go ahead and request the separately stored content, i.e. begin the slow start process because more likely than not, the client 102, 104, 106 will request this data upon receipt of the HTML code.

While cache servers 208 alleviate some of the problems with net congestion and request response times, they do not provide a total solution. In particular, they do not provide a viable solution for dynamic content (content which continually changes, such as news, as opposed to static or fixed content). This type of content cannot be cached otherwise the requesting client 102, 104, 106 will receive stale data. Furthermore, cache servers 208 often cannot support the bandwidth and processing requirements of streaming media, such as video or audio, and must defer these content requests to the server 108 which are the source of the content. Cache servers 208, in general, further lack the capability to service a large volume of requests from a large volume of clients 102, 104, 106 due to the immense capacity requirements. Typically, then general cache servers 208, such as those provided by a service provider 118, 120 will have high miss rates and low hit rates. This translates into a minimal impact on server 108 load, request response times and network 100 bandwidth. Moreover, as will be discussed below, by simply passing on requests which miss in the cache to the server 108 to handle, the server 108 is further subjected to increased security risks from the untrusted network 100 traffic which may comprise, for example, a denial of service attack or an attempt by a hacker to gain unauthorized access.

Figure 3:
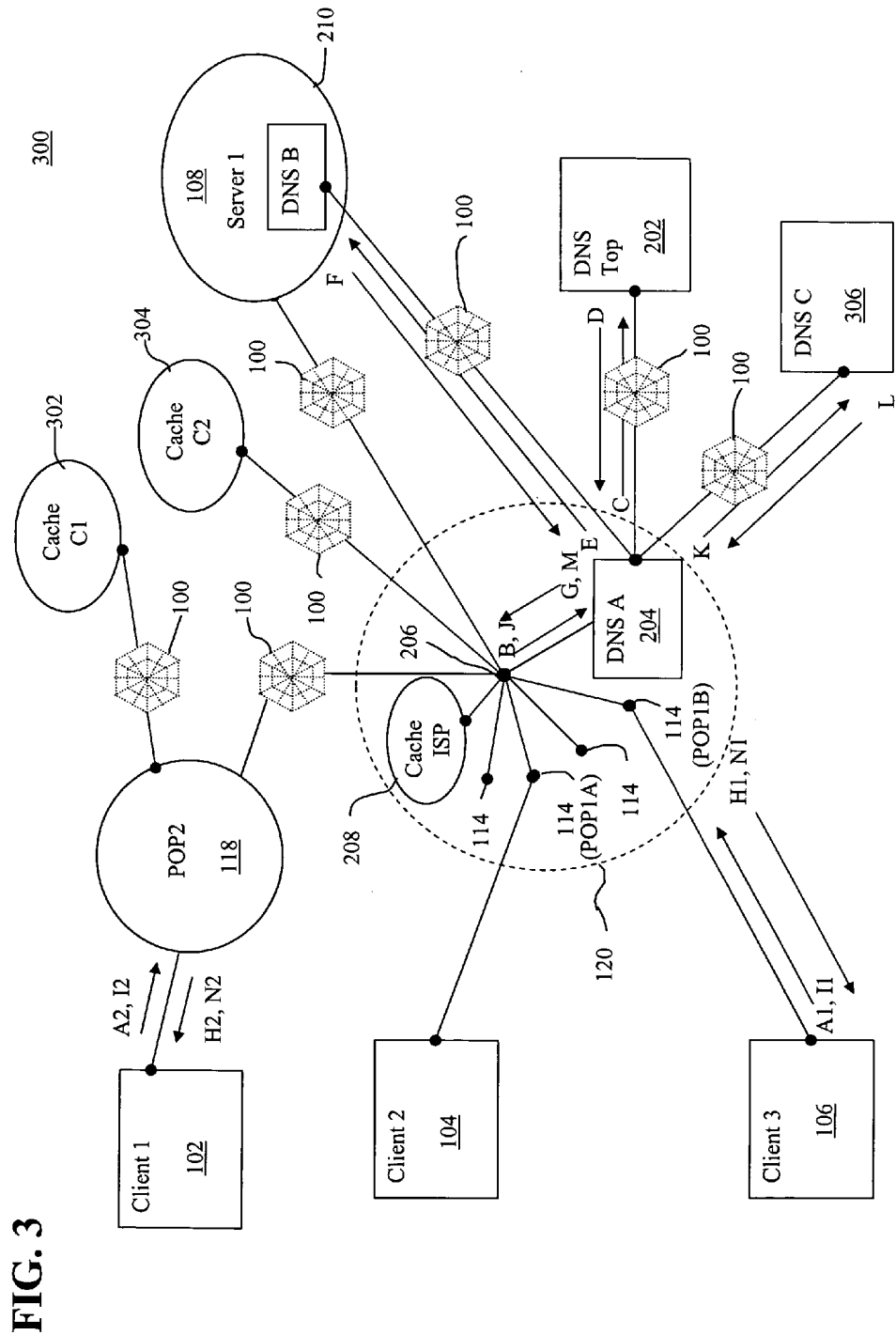
FIG. 3 depicts an exemplary content delivery system for use with the exemplary network of FIG. 1.

Referring now to FIG. 3, there is depicted an enhanced content delivery system 300 which provides optimized caching of content from the server 108 to the client 102, 104, 106 utilizing the HTTP slow start protocol. The system 300 is typically provided as a pay-for service by a content delivery service to which particular servers 108 subscribe to in order to enhance requests made by clients 102, 104, 106 for their specific content. FIG. 3 depicts the identical DNS system of FIG. 2 but adds cache servers 302 and 304, labeled "Cache C1" and "Cache C2" plus a special DNS translation server 306, labeled "DNS C" affiliated with the content delivery service.

The depicted system 300 implements one known method of "Content Delivery." Content delivery is the service of copying the pages of a Web site to geographically dispersed cache servers 302, 304 and, when a page is requested, dynamically identifying and serving the page from the closest cache server 302, 304 to the requesting client 102, 104, 106, enabling faster delivery. Typically, high-traffic Web site owners and service providers 118, 120 subscribe to the services of the company that provides content delivery. A common content delivery approach involves the placement of cache servers 302, 304 at major Internet access points around the world and the use of a special routing code embedded in the HTML Web pages that redirects a Web page request (technically, a Hypertext Transfer Protocol—HTTP—request) to the closest cache server 302, 304. When a client 102, 104, 106 requests the separately stored content of a Web site/server 108 that is "content-delivery enabled," the content delivery network redirects that client 102, 104, 106 to makes its request, not from the site's originating server 108, but to a cache server 302, 304 closer to the user. The cache server 302, 304 determines what content in the request exists in the cache, serves that content to the requesting client 102, 104, 106, and retrieves any non-cached content from the originating server 108. Any new content is also cached locally. Other than faster loading times, the process is generally transparent to the user, except that the URL ultimately served back to the client 102, 104, 106 may be different than the one initially requested. Content delivery is similar to but more selective and dynamic than the simple copying or mirroring of a Web site to one or several geographically dispersed servers. It will further be appreciated that geographic dispersion of cache servers is generally known to those of ordinary skill in the art.

FIG. 3 further details a known method of re-directing the requests generated by the client 102, 104, 106 to a nearby cache server 302, 304. This method utilizes the HTTP slow start protocol described above. When a client 102, 104, 106 wishes to request content from a particular server 108, it will obtain the IP address of the server 108, as described above, using the normal DNS translation system. Once the server's 108 IP address is obtained, the client 102, 104, 106 will make its first request for the HTML code file which comprises the desired Web page. As given by the HTTP slow start protocol, the server 108 will serve the HTML code file to the client 102, 104, 106 and then wait for the client 102, 104, 106 to request the separately stored files, e.g., the image and multimedia files, etc. Normally, these requests are made in the same way that the initial content request was made, by reading each URL from the HTML code file which identifies the separately stored content and formulating a request for that URL. If the domain name for the URL of the separately stored content is the same as the domain name for the initially received HTML code file, then no further translations are necessary and the client 102, 104, 106 can immediately formulate a request for that separately stored content because it already has the IP address. However, if the URL of the separately stored content comprises a different domain name, then the client 102, 104, 106 must go through the DNS translation process again to translate the new domain name into an IP address and then formulate its requests with the appropriate IP address. The exemplary content delivery service takes advantage of this HTTP slow start protocol characteristic.

The exemplary content delivery service partners with the subscribing Web server 108 and modifies the URL's of the separately stored content within the HTML code file for the particular Web page. The modified URL's include data which will direct their translation requests to a specific DNS translation server 306, DNS C provided by the content delivery service. DNS C is an intelligent translation server which attempts to figure out where the client 102, 104, 106 is geographically located and translate the URL to point to a cache server 302, 304 which is geographically proximate to the client 102, 104, 106. DNS C performs this analysis by knowing the IP address of the downstream DNS server 204, DNS A which it assumes is located near the client 102, 104, 106. By using this IP address and combining it with internal knowledge of the network 100 topology and assignment of IP addresses, DNS C 306 can determine the geographically optimal cache server 302, 304 to serve the requested content to the client 102, 104, 106.

An exemplary transaction is further depicted by FIG. 3. In this exemplary transaction, Client 3 106 wishes to request content from Server 1 108. Client 3 106 will establish the IP address of the source of the desired content using the standard DNS translation system described above, labeled "A1", "B", "C", "D", "E", "F", "G", "H1." Once Client 3 106 has the IP address of Server 1 108, it will generate a request for the initial HTML code file of the desired Web page and Server 1 108 will respond with the data. Client 3 106 will then request a particular separately stored file associated with the Web page by reading the URL from the HTML code file and translating the domain name contained therein. As noted above, this URL comprises the domain name of the content delivery service as well as an identifier which identifies the content being requested (since the content delivery service typically handles many different servers 108). Client 3 106 will generate another translation request to DNS A 204, labeled "I1" and "J." DNS A 204 will attempt to translate the given domain name but will fail because the content delivery service has set all of its translations to have a TTL=0. Therefore, DNS A 204 will be required to contact DNS C 306 which is provided by the content delivery service, labeled "K" and "L." Note that DNS A 204 may be required to contact DNS top 202 in order to locate the IP address of DNS C 306. DNS C 306 receives the translation request and knows the IP address of DNS A 204, which was given as the return address for the translation. Using the IP address of DNS A 204, DNS C 306 figures out which cache server 302, 304 is geographically proximate to Client 3 106, in this case, Cache C2 304. An appropriate IP address is then returned to by DNS C 306 to DNS A 204 and subsequently returned to Client 3 106. Client 3 106 then formulates its request for the separately stored data but, unwittingly, uses the IP address of the cache server C2 304. Cache server C2 304 receives the request and serves the desired content as described above.

FIG. 3 further illustrates a second exemplary transaction sequence which discloses a flaw in the depicted content delivery method. In this example, Client 1 102 wishes to request content from Server 1 108. Client 1 102 is a wireless or mobile client which is coupled with service provide 118 at POP2 but is bound to DNS A 204 provided by service provider 120. In this example, all of the translation and request transactions occur as in the above example for Client 3 106. The translation request to identify the IP address of the separately stored content will be handled by DNS A 204 which will then hand it off to DNS C 306 as described above. However, DNS C 306 will then attempt to identify a geographically proximate cache server 302, 304 based on the IP address of DNS A 204 which is not located near Client 1 102 in this example. Therefore DNS C 306 will return a translation directing Client 1 102 to cache server C2 304 when in fact, the optimal cache server would have been cache server C1 302. With more and more wireless and mobile user utilizing the Internet, misoptimized re-direction of content delivery will happen more frequently. Furthermore, there may be cases where the Client 102, 104, 106 is dynamically bound to a DNS translator associated with whatever POP 114, 116 they are connecting to. While this may appear to solve the problem, the content delivery service is still basing its redirection determination on an indirect indicator of the location of the client 102, 104, 106. However, the IP address of the DNS translator may still fail to indicate the correct geographic location or the correct logical location (based on the topology of the network 100) of the client 102, 104, 106 in relation to the DNS translator. A more accurate indicator of the client's 102, 104, 106 physical geographic location and/or network logical location is needed in order to make an accurate decision on which cache server 302, 304 to redirect that client 102, 104, 106 to.

V. The First Embodiment

Figure 4:
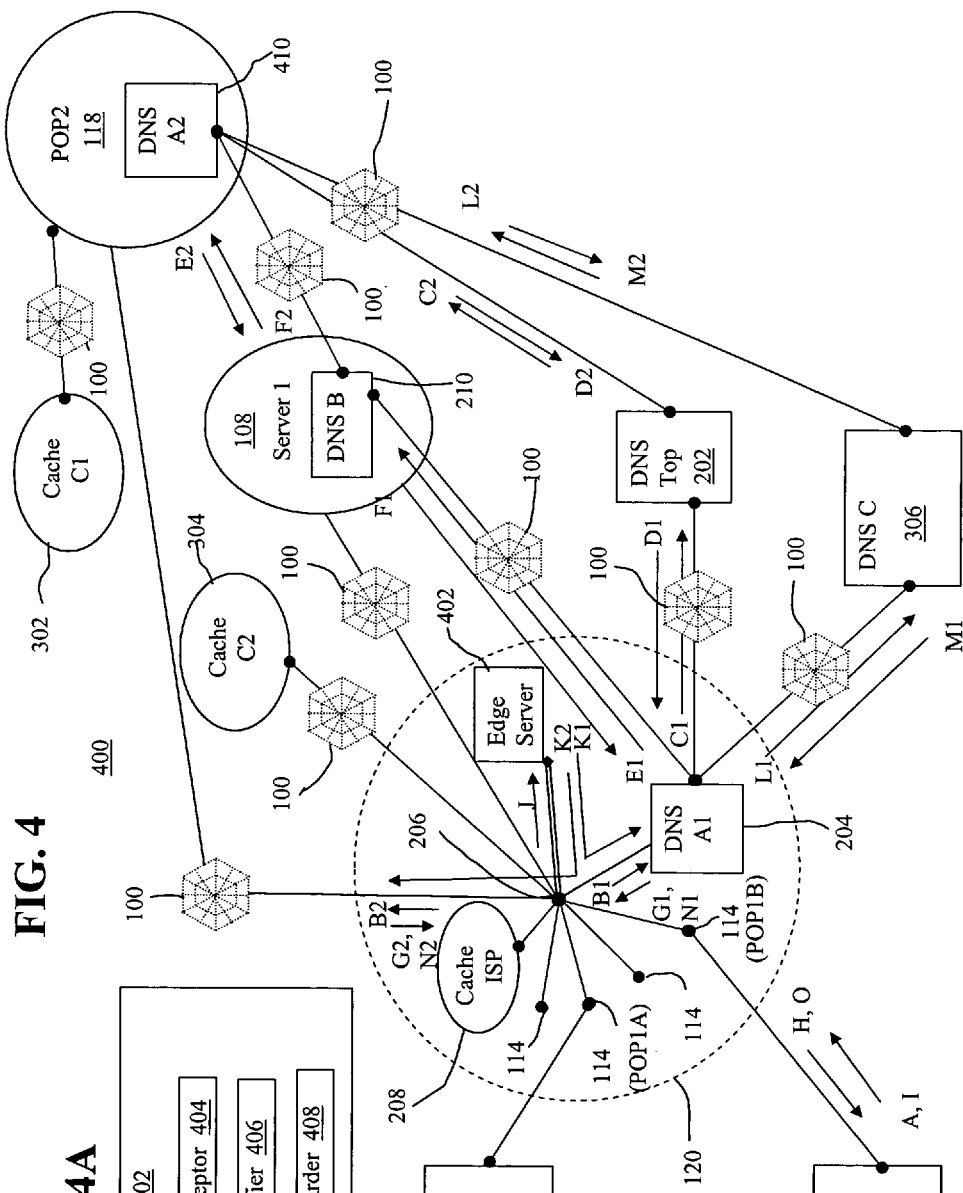
FIG. 4 depicts a content delivery system for use with the network of FIG. 1 according to a first embodiment.

Referring now to FIG. 4, there is depicted a first embodiment of an enhanced DNS system to facilitate the operation of content delivery services by eliminating the dependency on the geographic location of the downstream DNS server. In addition to what is shown in FIG. 3, the embodiment shown in FIG. 4 further adds an edge server 402 coupled with the routing equipment 206 and POP's 114 of an affiliated service provider 120 and preferably located within the affiliated server provider's 120 facilities. In one alternative embodiment, the edge server 402 is integrated with a router. In another alternative embodiment, the edge server is integrated with a generally accessible DNS translation server such as DNS A1 204. The edge server 402 is capable of monitoring the network traffic stream passing between the POP's 114 and the network 100, including the service provider's 120 hardware, such as the cache 208 and the DNS translation server 204, DNS A. The edge server 402 is further capable of selectively intercepting that traffic and preventing it from reaching its intended destination, modifying the intercepted traffic and reinserting the modified traffic back into the general network traffic stream. It is preferred that the facilities and capabilities of the edge server 402 be provided to content delivery services and or Web servers 108 on a fee for services basis as will be described below. Further, it is preferred that an edge server 402 be provided at every major service provider 118, 120 so as to be able to selectively intercept network traffic at all possible POP's 114, 116 of the network 100.

Figure 4A:
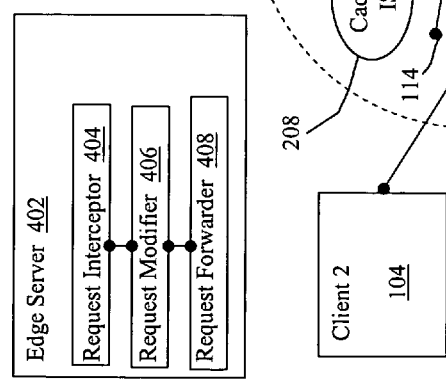
FIG. 4A depicts a block diagram of the edge server of FIG. 4.

Referring to FIG. 4A, the edge server 402 includes a request interceptor 404, a request modifier 406, and a request forwarder 408. The edge server 402 preferably includes one or more processors, a memory coupled with the processors and one or more network interfaces or other interfaces, also coupled with the processors and operative to couple or integrate the edge server 402 with the routing equipment of the service provider 120. Optionally, the edge server 402 may include secondary storage including a second memory such as a cache memory, hard disk or other storage medium. Further, the processors of the edge server 402 may be dedicated processors to perform the various specific functions described below. The edge server 402 preferably further includes software and/or firmware provided in a read only memory or in a secondary storage which can be loaded into memory for execution or, alternatively, executed from the secondary storage by the processors, to implement the various functions as detailed below. To further improve performance, such software functionality may also be provided by application specific integrated circuits ("ASICS"). For example, an edge server 402 can comprise a Compaq TaskSmart™ Server manufactured by Compaq Corporation, located in Austin, Tex. The TaskSmart™ Server can include an Intel IXA1000 Packet Processor manufactured by Intel Corporation, located in Santa Clara, Calif. to perform the traffic monitoring and port specific traffic interception functions as well as the security applications as detailed below. The TaskSmart™ Server can further include a PAX.port 1100™ classification adapter manufactured by Solidum Corporation, located in Scotts Valley, Calif., which can receive intercepted DNS translation requests from the packet processor and, utilizing a look up table (preferably stored in a memory providing high speed access), determine whether or not the request is associated with a subscribing server 108, as described below. The classification adapter can attempt to resolve the DNS request or hand it off to a general processor such as an Intel Pentium III™ or other general purpose processor for further operations as detailed below. An exemplary edge server 402 may have six 9.1 GB hot pluggable hard drives preferably in a RAID or other redundant configuration, two redundant hot pluggable power supplies, five 10/100 Ethernet ports and 1 GB of main memory and capable of handling in excess of 1250 requests per second.

The request interceptor 404 listens to the network traffic passing between the POP's 114 of the affiliated service provider 120 and the network 100 and selectively intercepts DNS translation requests generated by any of the clients 102, 104 coupled with the particular affiliated service provider 120. Such interception is preferably accomplished by identifying the destination "port" of any given data packet generated by a client 102, 104, alternatively other methods of identifying a packet type may be used such as by matching the destination address with a list of known DNS translation server addresses. A port in programming is a "logical connection place" and specifically, within the context of the Internet's communications protocol, TCP/IP, a port is the way a client program specifies a particular applications program on a computer in a network to receive its requests. Higher-level applications that use the TCP/IP protocol such as HTTP, or the DNS translation protocol, have ports with pre-assigned numbers. These are known as "well-known ports" and have been assigned by the Internet Assigned Numbers Authority (IANA). Other application processes are given port numbers dynamically for each connection. When a service (server program) initially is started, it is said to bind to its designated port number. As any client program wants to use that server, it also must request to bind to the designated port number. Port numbers are from 0 to 65536. Ports 0 to 1024 are reserved for use by certain privileged services. For the HTTP service, port 80 is defined as a default and it does not have to be specified in the Uniform Resource Locator (URL). In an alternative embodiment, the routing equipment 206 of the service provider 120 is programmed to forward all DNS translation requests to the edge server 402. The request interceptor 404 can then choose which DNS translation requests to intercept as described below. This alternative routing scheme may implemented through a traffic routing protocol such as a Domain Name System Translation Protocol ("DNSTP"). This protocol is implemented in similar fashion to the Web Cache Control Protocol ("WCCP") which is used to redirect HTTP requests to proxy cache servers based on the specified port in the packet.

DNS translation requests are identified by the port number 53. The request interceptor 404 monitors for all data traffic with the specified port number for a DNS translation request. It then is capable of intercepting DNS translation requests generated by clients 102, 104 such as computer workstations, wireless devices or internal DNS translators on a private network. The request interceptor 404 is aware of which content delivery services subscribe to the edge server 402 service and is operative to selectively intercept DNS translation requests associated with the subscribing content delivery service, i.e. contain translations intended to be translated by the DNS translator of the content delivery service or server 108. The request interceptor 404 may provide a table or database stored in memory or other storage device where it can look up the service subscribers to determine whether the particular DNS translation request should be intercepted. It is preferred that the request interceptor 404 make this determination at "wire speed", i.e. at a speed fast enough so as not to impact the bandwidth and throughput of the network traffic it is monitoring.

When a DNS translation request is generated by a client 102, 104 to translate a domain name associated with the content delivery service, as described above for the modified HTTP slow start protocol, to retrieve the separately stored Web page content, that DNS translation request will be selectively intercepted by the request interceptor 404 of the edge server 402. The interception will occur before it reaches the bound/destination DNS translation server bound to or specified by the client 102, 104. The request interceptor 404 will then pass the intercepted DNS translation request to the request modifier 406.

The request modifier 406 modifies the DNS translation request to include additional information or indicia related to the client 102, 104 so that the intelligent DNS translation server of the content delivery service or server 108 can make a more optimized decision on which of the geographically dispersed cache servers 302, 304 would be optimal to serve the requests of the client 102, 104. This additional information can include the geographic location of the POP 114 or the characteristics of the downstream network infrastructure, such as whether the client 102, 104 is connecting to the POP 114 via a modem connection or a broadband connection or whether the client 102, 104 is a wired or wireless client, etc. It will be appreciated that there may be other information or indicia that the edge server 402 can provide to enhance the DNS translation request and this may depend on the capabilities of the subscribing content delivery services, and all such additional indicia are contemplated. It is preferable that the subscribing content service providers are familiar with the indicia data types, content and possible encoding schemes which the edge server 402 can provide so as to establish a protocol by which the data is transferred to the subscribing content delivery service. Such information is then recognized and used by the content delivery service to enhance their redirection. For example, by knowing the geographic location of the POP 114 as provided by the edge server 402, the content delivery service does not need to rely on the IP address of the bound DNS server from which it receives the translation request (described in more detail below) and therefore will make a more accurate determination of which cache server 302, 304 to choose. Similarly, by knowing the capabilities of the downstream network infrastructure from the POP 114 to the client 102, 104 as provided by the edge server 402, the content delivery service can redirect content requests by the client 102, 104 to a cache server 302, 304 with capabilities which match. For example, where the POP 114 to client 102, 104 connection is a broadband connection, the client 102, 104 can be directed to make its requests to a cache server 302, 304 capable of utilizing the available bandwidth to the client 102, 104. In contrast, where the client 102, 104 connects to the POP 114 via a modem/standard telephone line connection, the content delivery service can direct that client 102, 104 to make its requests to an appropriate low speed cache server 302, 304 so as not to waste the resources of high bandwidth cache servers 302, 304.

Once the DNS translation request has been modified, the request modifier 406 passes the DNS translation request to the request forwarder 408. The request forwarder places the modified DNS translation request back into the general stream of network traffic where it can be routed to its originally intended destination, i.e. the bound or specified DNS translation server 204, 410 bound to or specified by the originating client. The DNS translation server 204, 410 will translate the request as described above, by contacting the DNS translation server 306, DNS C associated with the content delivery service. As described above, the intelligent DNS translation server 306 of the content delivery service will see the modified request and utilize the information/indicia included by the edge server 402 to make a more optimal translation and cache server 302, 304 assignment.

FIG. 4 depicts an exemplary content delivery transaction between Client 1 102 and Server 1 108. For the purposes of this example transaction, Client 1 102 is bound to DNS translation server 204, labeled "DNS A1." Client 1 102 initiates the HTTP slow start protocol as described above by making its initial request for an HTML Web page from Server 1 108. This initiation may require making several DNS translations as described above, labeled as "A", "B1", "C1", "D1", "E1", "F1", "G1", "H." Once the HTML Web page has been received by Client 1 102, it will begin to request the separately stored content associated with the Web page. As was discussed above, where Server 1 108 has been "content enabled" and subscribes to the content delivery service, the URL's of the separately stored content will comprise the domain name of the content delivery service. As well, as discussed above, these domain names will require complete DNS translation all the way back to the DNS translation server 306, DNS C of the content delivery service because the content delivery service ensures that all of its translations have TTL=0 and therefore cannot be stored in any given downstream DNS translation server. Therefore, Client 1 102 will initiate a DNS translation for the URL of the separately stored content, labeled "I." This DNS translation request will go through the POP 114 and to the routing equipment 206 of the service provider 120. The edge server 402 will see this DNS translation request and identify the domain name of the content service provider as a subscriber to its service. The request interceptor 404 will then intercept the DNS translation request, labeled as "J." The request interceptor 404 will pass the intercepted DNS translation request to the request modifier 406 which will append a geographic indication representing the physical geographic location of the edge server 402 or alternatively, other downstream network characteristics. Given that the edge server 402 is located geographically proximate to the POP's 114, this information will more accurately represent the location of Client 1 102. Alternatively, while the edge server 402 may not be geographically proximate to the POP's 114, it may be network proximate to the POP's 114, i.e. there may be a minimal of network infrastructure between the POP's 114 and the edge server 402. In some instances, while one device on a network may sit physically right next to another device on the network, the network topology may dictate that data flowing between those devices flow over a circuitous route to get from one device to the other. In this case, while the devices are physically close to one another, they are not logically close to one another. The edge server 402 is preferably familiar, not only with its geographic location within the context of the network 100 as a whole, but also its logical location. Using this information, the edge server 402 can further include information as to this logical location so as to enable, not only a geographically optimal redirection of Client 1's 102 requests but also a network topology based optimized redirection.

The request modifier 406 will then pass the modified DNS translation request to the request forwarder 408 which will place the request back into the general traffic stream, and in this case, on its way to the original intended recipient, Client 1's 102 bound DNS translation server 204, DNS A1, labeled as "K1." DNS A1 204 will then translate the modified DNS translation request as described above and return the translation to Client 1 102, labeled as "L1", "M1", "N1", "O." DNS C 306, using the additional data provided by the edge server 402, will supply a DNS translation redirecting Client 1's 102 requests to Cache C2 304 which is the optimal cache server.

FIG. 4 further depicts a second exemplary content delivery transaction between Client 1 102 and Server 1 108. For the purposes of this second example transaction, Client 1 102 is a wireless or mobile wired device connecting to a POP 114 provided by service provider 120 but is bound to DNS translation server 410, labeled "DNS A2" provided by service provider 118. Note that in the previous exemplary transaction above, Client 1 102 was bound to DNS A1 204, e.g., Client 1 102 was a stationary computer or private network subscribing to the network 100 connection services of service provider 120 and using the POP's 114 provided by the service provider 120 and that service provider's 120 DNS translation server 204, DNS A1. In the current example, Client 1 102 is a subscriber to the network 100 connections services of service provider 118 but is currently roaming, i.e. geographically located in an area not serviced by a POP 116 provided by service provider 118. Therefore Client 1 102 must use a POP 114 provided by a service provider 120, which for example, has an agreement to allow such connections from service provider's 118 customers. However, because DNS translation servers are bound to the Client 102, i.e. the address of the preferred DNS translation server is programmed into the Client 102, Client 102 will still use its programmed or bound DNS translation server, typically the DNS translation server provided by its service provider 118, in this case DNS A2 410.

As above, Client 1 102 initiates the HTTP slow start protocol as described above by making its initial request for an HTML Web page from Server 1 108. This initiation may require making several DNS translations as described above but using DNS A2 410 instead of DNS A1 204, labeled as transactions "A", "B2", "C2", "D2", "E2", "F2", "G2", "H." Once the HTML Web page has been received by Client 1 102, it will begin to request the separately stored content associated with the Web page. As was discussed above, where Server 1 108 has been "content enabled" and subscribes to the content delivery service, the URL's of the separately stored content will comprise the domain name of the content delivery service. As well, as discussed above, these domain names will require complete DNS translation all the way back to the DNS translation server 306, DNS C of the content delivery service because the content delivery service ensures that all of its translations have TTL=0 and therefore cannot be stored in any given downstream DNS translation server. Therefore, Client 1 102 will initiate a DNS translation for the URL of the separately stored content, labeled "I." This DNS translation request will go through the POP 114 and to the routing equipment 206 of the service provider 120. The edge server 402 will see this DNS translation request and identify the domain name of the content service provider as a subscriber to its service. The request interceptor 404 will then intercept the DNS translation request, labeled as "J." The request interceptor 404 will pass the intercepted DNS translation request to the request modifier 406 which will append a geographic indication representing the physical geographic location of the edge server 402. Given that the edge server 402 is located geographically proximate to the POP's 114, this information will more accurately represent the location of Client 1 102. Alternatively, while the edge server 402 may not be geographically proximate to the POP's 114, it may be network proximate to the POP's 114, i.e. there may be a minimal of network infrastructure between the POP's 114 and the edge server 402. In some instances, while one device on a network may sit physically right next to another device on the network, the network topology may dictate that data flowing between those devices flow over a circuitous route to get from one device to the other. In this case, while the devices are physically close to one another, they are not logically close to one another. The edge server 402 is preferably familiar, not only with its geographic location within the context of the network 100 as a whole, but also its logical location. Using this information, the edge server 402 can further include information as to this logical location so as to enable, not only a geographically optimal redirection of Client 1's 102 requests but also a network optimized redirection.

The request modifier 406 will then pass the modified DNS translation request to the request forwarder 408 which will place the request back into the general traffic stream, and in this case, on its way to the original intended recipient, Client 1's 102 bound DNS translation server 410, DNS A2, labeled as "K2." DNS A2 410 will then translate the modified DNS translation request as described above and return the translation to Client 1 102, labeled as "L2", "M2", "N2", "O." In this case, without the additional data provided by the edge server 402, DNS C 306 would have made its redirection determination based on the IP address of DNS A2 410, as described above. This would have resulted in Client 1 102 being redirected to Cache C1 302 instead of the optimal cache for its location. However, DNS C 306, using the additional data provided by the edge server 402 is able to supply a DNS translation redirecting Client 1's 102 requests to Cache C2 304 which is the optimal cache server.

VI. The Second Embodiment

Referring to FIG. 5, there is depicted a second embodiment of an enhanced DNS system to facilitate content delivery which is not dependent upon the geographic location of the downstream DNS server and is capable of enhancing the HTTP slow start protocol.

FIG. 5 shows Clients 1 and 2 102, 104 coupled with POP's 114, POP1A and POP1B of service provider 120. As described above, service provider 120 includes routing equipment 206, Cache 208 and DNS translation server 204 to facilitate coupling the POP's 114 with the network 100. In addition, service provider 120 further includes an edge server 502 and an edge cache 508. In one alternative embodiment, the edge server 502 is integrated with a router. In another alternative embodiment, the edge server 502 is integrated with a generally accessible DNS translation server such as DNS A 204. In still another alternative embodiment, the edge server 502 can be integrated with the edge cache 504 or each can be provided as separate devices or the edge server 502 can utilize an existing cache server 208 provided by the service provider 120. For clarity, a number of the components of FIG. 4 have been omitted from FIG. 5.

Referring to FIG. 5A, the edge server 502 further includes a request interceptor 504 and an edge DNS translation server 506. It is preferred that the facilities and capabilities of the edge server 502 be provided to Web servers 108 on a subscription or fee for services basis as will be described below. It is further preferred that an edge server 502 and edge cache 508 be provided at every service provider 118, 120 or at every major network 100 intersection so as to provide coverage of every POP 114, 116 on the edge 124 of the network 100. The edge server 402 preferably includes one or more processors, a memory coupled with the processors and one or more network interfaces or other interfaces, also coupled with the processors and operative to couple or integrate the edge server 502 with the routing equipment of the service provider 120. Optionally, the edge server 502 may include secondary storage including a second memory such as a cache memory, hard disk or other storage medium. Further, the processors of the edge server 502 may be dedicated processors to perform the various specific functions described below. The edge server 502 preferably further includes software and/or firmware provided in a read only memory or in a secondary storage which can be loaded into memory for execution or, alternatively, executed from the secondary storage by the processors, to implement the various functions as detailed below. To further improve performance, such software functionality may also be provided by application specific integrated circuits ("ASICS"). For example, an edge server 502 can comprise a Compaq TaskSmart™ Server manufactured by Compaq Corporation, located in Austin, Tex. The TaskSmart™ Server can include an Intel IXA 1000 Packet Processor manufactured by Intel Corporation, located in Santa Clara, Calif. to perform the traffic monitoring and port specific traffic interception functions as well as the security applications as detailed below. The TaskSmart™ Server can further include a PAX. port 1100™ classification adapter manufactured by Solidum Corporation, located in Scotts Valley, Calif., which can receive intercepted DNS translation requests from the packet processor and, utilizing a look up table (preferably stored in a memory providing high speed access), determine whether or not the request is associated with a subscribing server 108, as described below. The classification adapter can attempt to resolve the DNS request or hand it off to a general processor such as an Intel Pentium III™ or other general purpose processor for further operations as detailed below. An exemplary edge server 502 may have six 9.1 GB hot pluggable hard drives preferably in a RAID or other redundant configuration, two redundant hot pluggable power supplies, five 10/100 Ethernet ports and 1 GB of main memory and capable of handling in excess of 1250 requests per second.

As described above, the request interceptor 504 operates to selectively intercept DNS translation requests associated with its subscribing Web server 108 generated by clients 1 and 2 102, 104. Alternatively, DNS translation requests can be forwarded to the request interceptor 504 by the service provider's 120 routing equipment 206 as described above. In this embodiment, however, because the request interceptor 504 is monitoring for DNS translation requests associated with the server 108 and not some separate content delivery service, the request interceptor 504 will selectively intercept all DNS translation requests, including the initial request to retrieve the HTML Web page file and begin the HTTP slow start protocol. Again, the request interceptor 504 preferably includes a database or table stored in a memory or other storage medium which indicates the domain names or other identification information of subscribing servers 108.

The selectively intercepted DNS translation requests are passed by the request interceptor 504 to an internal edge DNS translation server 506. The internal edge DNS translation server 506 then translates the given domain name into the IP address of the edge cache 508 and returns this translation to the client 102, 104, labeled "A", "B", "C", "D." This effectively redirects the client 102, 104 to make all of its content requests from the edge cache 508. As opposed to a proxy server, where the client 102, 104 is not redirected but either thinks that it is communicating with the server 108 (in the case of a transparent or server side reverse proxy server) or has been specifically programmed to communicate its requests to the proxy server (in the case of a client side forward proxy server). The edge cache 508 operates as a normal cache server as described above, attempting to satisfy content requests from its cache storage. However, when the requested content is not available in the cache storage (a cache miss), the request is proxied to the server 108 by the edge cache 508 and/or edge server 502, i.e. the edge cache 508 and/or edge server 502 make the request on behalf of the client 102, 104. This is in contrast to normal cache servers which forward the request from the client 102, 104 onto the server 108 upon a cache miss.

Cache misses are handled as described above, the edge server 502 or alternatively the edge cache 508 makes its own request for the uncached content from the server 108. Alternatively, other algorithms can be used to reduce or eliminate cache misses including mirroring the content of the server 108 coupled with periodic updates either initiated by the edge server 502 or edge cache 508 or periodically pushed to the edge cache 508 by the server 108. In another alternative embodiment, the server 108 can update cached content when it determines that such content has changed or can provide time durations or other form of expiration notification after which the edge cache 508 purges the content. Where the content expires or is otherwise purged from the edge cache 508, the next request for that content will miss and cause a reload of the content from the server 108. One of ordinary skill in the art will recognize that there are many caching algorithms which may be used to maintain cache coherency. It is further preferable that the edge cache 508 maintain a replacement policy of replacing the oldest data in the cache when the cache is full. Again, one of ordinary skill in the art will recognize that there are many different cache replacement algorithms that may be used.

In this way, the edge server 502 and edge cache 508 act similarly to a forward or reverse proxy server for all of its subscribing servers 108. Generally, a reverse proxy server is a proxy server that hides multiple source servers behind a single address. A reverse proxy server allows a content provider to serve their content from multiple host computers without requiring users to know the addresses of each of those computers. When a user makes a request to a content provider, they use the address of the reverse proxy server. The reverse proxy server intercepts the requests for content from the source and redirects those requests to the appropriate host computer within the content provider. The redirection can be based on a which machine contains the requested content or can be used to balance the request load across multiple mirrored servers. A forward proxy server sits between a workstation user and the Internet so that the enterprise can ensure security, administrative control and caching services. A forward proxy server can be associated with a gateway server which separates the enterprise network from an outside network such as the Internet. The forward proxy server can also be associated with a firewall server which protects the enterprise network from outside intrusion. Forward proxy servers accept requests from their users for Internet content and then request that content from the source on behalf of the user. The forward proxy server modifies the identity of the requestor (typically by altering the internet protocol address of the requestor) to be that of the forward proxy server. A user workstation typically must be configured to use a proxy server. A forward proxy server can also be a cache server (see above).

A major distinction between the edge server 502 and a proxy server is that there is no one address of the edge server 502. The edge server 502 effectively needs no address because it intercepts the necessary network traffic. Therefore, clients 102, 104 do not need to know of the existence of the edge server 502 and can operate as they normally do, making content requests of servers 108. However, when they request content from a subscribing server 108, that content will be transparently provided instead by the edge server 502 and edge cache 508.

Effectively, the edge server 502 and edge cache 508 isolate the sub-network comprising the service provider 120, the POP's 114 and the clients 102, 104 from the subscribing server 108, i.e. the clients 102, 104 are prevented from any direct contact with server 108. Should the client 102, 104 request uncached content, it is the edge cache 508 and not the client 102, 104 which will request that content from the server 108. Furthermore, the edge server 502 and edge cache 508 can ensure that the request is valid and legitimate before communicating with the server 108. This "trusted" relationship between the edge server 502/edge cache 508 and the subscribing servers acts as additional security for the servers 108. Those servers 108 can be programmed to ignore content requests from clients 102, 104 since they know that only valid content requests can come from an edge server 502/edge cache 508. Furthermore, the edge server 502 alleviates the load on the server's 108 internal DNS translation server 210 because all DNS translations will be handled by the internal edge DNS translator 506.

The effect of the edge server 502 and edge cache 508 is faster DNS translations and better response times to requests. The edge cache 508 can serve the initial HTML Web page file to the requesting client 102, 104 and immediately begin the process of requesting the separately stored content (if not already in the cache) from the server 108 in order to speed up the HTTP slow start protocol. Furthermore, it is preferred that the edge caches 508 located through out the edge 124 of the network 100 be capable of communicating and sharing cached data. In this way, the edge caches 508 can further reduce the demands placed on the subscribing servers 108.

Notice, however, that because the edge server 502 intercepts translation requests, a client 102, 104 that already knows the IP address of the server 108, can still directly communicate with that server 108 via the network 100. In this case, the server 108 can choose to disconnect itself from the network 100 generally (or refuse to accept any inbound content requests from the network 100 that do not originate from an edge server 502/edge cache 508, however such origination may be forged). The edge server 502 and edge cache 508 can then connect with the server 108 using private proprietary communications links which are not available to clients 102, 104.

The edge server 502 and edge cache 508 can also provide load balancing and security services to the subscribing servers. For example, open source load balancing techniques available from eddieware.org can be implemented in the edge server 502. Where a particular server 108 comprises multiple sub-servers, the edge cache 508 can be programmed to request uncached content from the sub-servers so as to spread the load on each sub-server.

Further, because the edge server 502 acts as the DNS translator server for its subscribers, it can detect and absorb any security attacks based on the DNS system, such as distributed denial of service attacks, "DDOS." A Denial of Service Attack ("DOS" or Distributed DOS "DDOS") is an incident in which a user or organization is deprived of the services of a resource they would normally expect to have. Typically, the loss of service is the inability of a particular network service, such as e-mail, to be available or the temporary loss of all network connectivity and services. In the worst cases, for example, a Web site accessed by millions of people can occasionally be forced to temporarily cease operation. A denial of service attack can also destroy programming and files in a computer system. Although usually intentional and malicious, a denial of service attack can sometimes happen accidentally. A denial of service attack is a type of security breach to a computer system that does not usually result in the theft of information or other security loss. However, these attacks can cost the target person or company a great deal of time and money.

DDOS attacks come in mainly two varieties, one attempts to shut down the DNS system in relation to the target site so that no legitimate user can obtain a valid translation and make a request from the site. Another type of DDOS attack attempts to overload the server 108 directly with a flood of content requests which exceed the capacity of the server. However, it will be appreciated that, by placing edge servers 502 and edge caches 508 so that all POP's 114, 116 are covered and can be monitored, DDOS attacks can never reach the server 108 itself and will always be detected close to their origination by an edge server 502 where they can be stopped and isolated. It will be further apparent that where a DDOS attack cripples one edge server 502 and its associated sub-network, the remaining edge servers 502 at other service providers 118, 120 (and their associated sub-networks) can remain operational and therefore the server 108 suffers minimal impact as a result of the DDOS attack. In addition, it is preferred that the edge server 502 and edge cache 508 provide bandwidth and processing power far in excess of that needed by the sub-network comprising the POP's 114 and service provider 120 in order to be able to absorb DDOS attacks and not be crippled by them.

It will further be appreciated, that the edge server 502 can incorporate the capabilities of the edge server 402 by providing enhanced DNS translations for subscribing content delivery services as well as the enhanced content delivery itself for subscribing servers 108.

In addition, where client 102, 104 is a private network such as an intranet, which has its own internal DNS translation server which is making DNS translation requests out to the network 100, the edge server 502 can set its returned DNS translations to have a TTL=0 so that the client's 102, 104 internal DNS server must always forward DNS translation requests to subscribing server 108 upstream where they can be intercepted by the edge server 502. Otherwise, the caching function of the client's 102, 104 internal DNS translation server would prevent proper DNS translations from occurring. Notice that this is not an issue in the first embodiment, because as discussed above, the content delivery service performs the DNS translations and always sets translation TTL=0 to facilitate its operation.

VII. The Third Embodiment

Referring to FIG. 6, there is depicted an enhanced network 100 to facilitate content delivery and network 100 security. FIG. 6 depicts clients 1 and 2 102, 104 connected with POP's 114, POP2A and POP2B of service provider 118 effectively forming a sub-network of the network 100. Further, clients 3 and 4 106, 612 are shown connected to POP's 116, POP1A and POP1B of service provider 120. Further, service providers 118, 120 each include an edge server 602A, 602B and an edge cache 604A, 604B coupled with the routing equipment 206 of the service providers 118, 120 so as to be able to intercept all network traffic flowing between the POP's 114, 116 and the network 100. In one alternative embodiment, the edge server 602 is integrated with a router. In another alternative embodiment, the edge server 602 is integrated with a generally accessible DNS translation server such as DNS A1 204 or DNS A2 410. In still another alternative embodiment, the edge server 602 is integrated with the edge cache 604, or alternatively they can be implemented as separate devices or the edge server 602 can utilize a cache server 208 provided by the service provider 118, 120 (not showing in FIG. 6). It is preferred that the facilities and capabilities of the edge servers 602 be provided to Web servers 108 on a subscription or fee for services basis as will be described below. It is further preferred that an edge server 602 and edge cache 604 be provided at every service provider 118, 120 or at every major network 100 intersection so as to provide coverage of every POP 114, 116 on the edge 124 of the network 100, i.e. to minimize the size of the sub-network downstream from the edge server 602.

Referring to FIG. 6A, the edge server 602 further includes a request filter 606, a request interceptor 608 and a proxy server and/or internal DNS translation server 610. The edge server 602 is capable of operating similarly to the edge server 402 and 502 of the previous embodiments. However, the edge server 602 is further capable of intercepting data traffic at the packet level based on the source or destination IP address contained within the packets flowing past the edge server 602. In this way, the edge server 602 is able to provide complete isolation of its subscribing servers 108, 110. Any network traffic destined for a subscribing server 108, 110 can be intercepted by the edge server 602 and acted upon. The edge server 602 preferably includes one or more processors, a memory coupled with the processors and one or more network interfaces or other interfaces, also coupled with the processors and operative to couple or integrate the edge server 602 with the routing equipment of the service provider 120. Optionally, the edge server 602 may include secondary storage including a second memory such as a cache memory, hard disk or other storage medium. Further, the processors of the edge server 602 may be dedicated processors to perform the various specific functions described below. The edge server 602 preferably further includes software and/or firmware provided in a read only memory or in a secondary storage which can be loaded into memory for execution or, alternatively, executed from the secondary storage by the processors, to implement the various functions as detailed below. To further improve performance, such software functionality may also be provided by application specific integrated circuits ("ASICS"). For example, an edge server 602 can comprise a Compaq TaskSmart™ Server manufactured by Compaq Corporation, located in Austin, Tex. The TaskSmart™ Server can include an Intel IXA1000 Packet Processor manufactured by Intel Corporation, located in Santa Clara, Calif. to perform the traffic monitoring and port specific traffic interception functions as well as the security applications as detailed below. The TaskSmart™ Server can further include a PAX.port 1100™ classification adapter manufactured by Solidum Corporation, located in Scotts Valley, Calif., which can receive intercepted DNS translation requests from the packet processor and, utilizing a look up table (preferably stored in a memory providing high speed access), determine whether or not the request is associated with a subscribing server 108, as described below. The classification adapter can attempt to resolve the DNS request or hand it off to a general processor such as an Intel Pentium III™ or other general purpose processor for further operations as detailed below. An exemplary edge server 602 may have six 9.1 GB hot pluggable hard drives preferably in a RAID or other redundant configuration, two redundant hot pluggable power supplies, five 10/100 Ethernet ports and 1 GB of main memory and capable of handling in excess of 1250 requests per second.

For valid content requests from clients 102, 104, 106, 612, the edge server 602 in combination with the edge cache 604 acts just like the edge server 502 and edge cache 508 in the previous embodiment. Such requests will be redirected and served from the edge cache 604. Again an edge cache 604A at one service provider 118 can share cached data from another edge cache 604B located at another service provider 120. In this way, a comprehensive content delivery service is created which completely isolates the core 122 of the network 100 from untrusted and unregulated client 102, 104, 106, 602 generated network traffic. Such traffic is isolated at the edge 124 of the network 100 within the sub-network below, i.e. downstream from the edge server 602 where it can be contained, monitored and serviced more efficiently. In terms of the economics of the network 100 then, the load on the expensive high bandwidth communications resources located at the core 122 of the network 100 is reduced and maintained at the edge 124 of the network where bandwidth is less expensive.

In addition, the edge server's 602 packet level filter 606 prevents any client 102, 104, 106, 612 from directly communicating with any subscribing server 108, 110 even if that client 102, 104, 106, 612 has the IP address of the server 108, 110. The packet level filter 608 will see the destination IP address in the network traffic and selectively intercept that traffic.

Once traffic is intercepted, the edge server 602 can perform many value added services. As described above, the edge server 602 can perform DNS translations and redirect clients 102, 104, 106, 612 to make their content requests to the edge cache 604. The edge server 602 can also monitor the data transmission being generated by clients 102, 104, 106, 602 for malicious program code, i.e. program code that has been previously identified (by the server 108 or a third party such as a virus watch service) as unwanted, harmful, or destructive such as viruses or other unauthorized data being transmitted. For example, if the edge server 602A detects a data packet whose origin address could not have come from the downstream network or POP's 114 to which it is connected, the edge server 602A knows that this data packet must be a forgery and can eradicate it or prevent it from reaching the network 100. For example, where a computer hacker surreptitiously installs a program on client 1 102 to make a DDOS attack on server 1 108 but appear as if the attack is coming from client 4 612, the edge server 602A will see the packets generated by Client 1 102 and also see that they contain a source address associated with a client, in this case client 4 612, which based on the address, could not have come from any POP 114 of the service provider 118 to which the edge server 602A is connected. In this case, the edge server 602A can eliminate that packet and then attempt to identify the actual originating client, in this case client 1 102, so that the attack can be stopped and investigated. In addition, because general network traffic is unable to reach the subscribing servers 108, 110, hackers would be unable to access those servers in attempts to steal valuable data such as credit card numbers.

Furthermore, to enhance security, as described above, the connections between the edge servers 602A, 602B and edge caches 604A, 604B can alternatively be made through private communications links instead of the publicly accessible network 100. In this way, only trusted communications over secure communications links can reach the servers 108, 110. This security in combination with the multiple dispersed edge servers 602A, 602B and edge caches 604A, 604B covering the edge 124 of the network 100 ensures that the subscribing servers 108, 110 will be able to serve their content under high demand and despite security threats.

In operation, the request filter 606 pre-filters traffic before receipt by the request interceptor 608. The request filter 606 preferably provides subscriber detection, "ingress filtering" capability, and cache hit determination. The request filter 606 first determines whether or not the traffic it is monitoring is associated with a subscribing/affiliated server 108, 110. If not, this traffic is ignored and allowed to proceed to its final destination. The request filter 606 preferably comprises a table or database of subscribers stored in a memory or other storage device. If the traffic is associated with a subscribing server 108, 110, the request filter 606 then performs ingress filtering by determining whether the packet originated downstream from the edge server 602, i.e. from the downstream sub-network, the POP's 114, 116 affiliated with this particular edge server 602 or from upstream which indicates that they did not originate from an affiliated POP 114, 116 and therefore are suspect and most likely invalid. Packets originating from upstream are preferably eradicated. Valid downstream originating packets are then analyzed for the content/nature of the packet. If the packet comprises a content request, the request filter 606 can determine if the request can be satisfied by the edge cache 604. Preferably, the request filter 606 maintains a table or database in memory or other storage medium of the edge cache 604 contents. If the packet contains a request that can be satisfied from the edge cache 604, the request filter 606 will hand the packet/request off to the edge cache 604. The edge cache 604 operates similarly to the edge cache 508 of the above embodiment. If the packet comprises a DNS translation request or a content request which cannot be satisfied by the edge cache 604, the request filter 606 hands the packet/request off to the internal request transmitter/proxy server/DNS translation server 610 to proxy, e.g. transmit, the request to the intended server or provide a DNS translation. The server 108 responds with the requested content to the edge server 602 and/or edge cache 604 which then returns the response to the requesting client 102, 104, 106, 612 and/or caches the response. It is preferred that the request filter 606 be able to perform its functions at "wire speed", i.e. a speed at which will have minimal impact on network 100 bandwidth and throughput. The request filter 606 then further alleviates the processing load on the internal DNS translator/proxy server 610 of the edge server 602.

It will be appreciated that, in any of the above embodiments, additional upstream edge servers and edge caches can be provided at major peering points to provide a layered hierarchy of cache storage tiers which further enhances the response times. In addition, a hierarchy of edge servers and edge caches can be used to handle any overload of one or more downstream edge servers and edge caches or to handle spill over of capacity or even a complete failure of one or more edge servers or edge caches. By forming a hierarchy of edge servers and edge caches, the network 100 and service provider 118, 120 fault tolerance is increased and enhanced.

The edge servers and edge caches therefore act similarly to proxy servers. However, where a forward proxy server alters the source address of a given content request (effectively making that request on behalf of a client), an edge server merely adds additional data to the source address which can then be used by upstream content delivery services for more accurate redirection or intercepts and substitutes the address translation transactions to redirect a client to make its requests from a nearby edge cache. Therefore, there is no need to intercept content requests since those requests will have been already directed to the edge cache. While a reverse proxy server is typically tightly bound with a group of servers which belong to a single entity or comprise a single Web site, the edge server performs reverse proxy functions but for any entity or Web site which subscribes to the service. Furthermore, no changes are required to the client or the subscribing servers. Once the subscriber tables are updated within the edge servers, the edge server will then start to perform its functions on the network traffic of the subscribing Web server. The subscribing Web server does not need to alter their Web site in any way and the client does not need to be pre-programmed to communicate with the edge server.

Further the network of edge servers and edge caches located at every major network intersection so as to cover every POP, thereby minimizing the size of the sub-network downstream from the edge server, forms a security barrier which isolates the core infrastructure and servers of the network/internet from the edge where the clients are located. In addition to isolation, network performance is enhanced by virtually placing the content and services of core content providers at network-logically and physically-geographic proximate locations with respect to the clients. Content is placed as close as possible to the requesters of that content resulting in enhanced response times and enhanced throughput. This results in reduced load, congestion and bandwidth consumption of the expensive high capacity backbone links which form the core of the network. Trivial network traffic is maintained at the edge of the network speeding response times and throughput. In addition, the edge caches are capable of communicating with one another and sharing cached data, thereby greatly enhancing the caching effect and further reducing the load on the core of the network.

By further making the edge servers more intelligent, such as by adding additional processing capacity, dynamic load balancing services can be provided to the subscribing servers which can respond to changing demands for content. The edge servers and edge caches are further located to minimize the number of downstream clients, thereby forming sub-networks which can isolate and contain network traffic. This allows security services to be provided by isolating security threats to the smallest possible portion of the network generally while leaving the remaining portions of the network fully operational. Further, would be hackers are prevented from being able to directly access a subscribing server an trying to break in and steal valuable data. Therefore, even where a particular server has a security hole, the data stored there will still be protected. In addition, the edge server is aware of it physical/geographic location and its logical location within the network hierarchy allowing it to enhance content redirection services as clients go wireless or otherwise go more mobile in relation to their service providers. Finally, the provision of a decentralized DNS enhancement system, as provided by the presently preferred embodiments, reduces the load on the existing DNS system and on subscribing servers' internal DNS systems as well as provides a distributed defense against DNS based denial of service attacks. Such attacks can be isolated to the smallest portion of the network possible and closest to the attacks source while the remaining portions of the network remain unaffected. Further, by isolating the attack, the source of the attack can be more easily pinpointed and investigated. Traffic can be monitored for unauthorized or malicious program code, i.e. program code previously identified as unwanted, harmful or destructive, such as the placement of zombies or virus programs. Such programs can be detected and eradicated before they can make it to their intended destination.

In addition, the provision of the decentralized DNS enhancement system, as provided by the presently preferred embodiments, provides an infrastructure which may be used to supplant the existing DNS system and allow the creation of new domain names and a new domain name allocation service. New services such as a keyword based DNS system may also be provided to further increase the ease of use of the network 100 and which do not rely on any modifications to a users Web browser program; i.e. remain transparent to both the client and the content provider. A user's attempt to request content from a subscribing content provider using a new domain name provided by this new DNS system would be intercepted prior to reaching the existing DNS system and be properly translated so as to direct the user to the content provider. Alternatively, the request may be redirected to an edge server and edge cache which proxy's the request for the user to the content provider. Such a system allows the content provider to remain a part of the network 100, i.e. remain connected to the Internet and maintain their access within the existing DNS system, or they may choose to completely disconnect from the network 100 altogether and utilize proprietary communications links to the network of edge servers and edge caches to provide users/clients with access to their content.

It will be further appreciated by one of ordinary skill in the art that the provision of numerous distributed edge servers and edge caches encircling the core of the network 100 provides a secure decentralized infrastructure on which service applications can be built. Through the provision of additional application and data processing capabilities within the edge servers, service applications such as user applications (for example, content monitoring/filtering, advertising filtering, privacy management and network personalization), e-commerce applications (such as regional and local electronic store fronts, distributed shopping carts or advertising distribution), distributed processing applications, database access applications (such as distributed enterprise database access), communications applications (such as electronic mail, identity authentication/digital signatures, anti-spam filtering and spam source detection, voice telephony and instant messaging), search engine applications, multimedia distribution applications (such as MP3 or MPEG distribution and content adaptation), push content applications (such as stock quotes, news or other dynamic data distribution), network applications (such as on-demand/dynamic virtual private networks and network/enterprise security), etc. can be implemented. These applications can be implemented with minimal hardware at the network 100 core 122 because much of the processing load and bandwidth demands are distributed out at the edge 124 of the network 100. Further, any application where decentralization of the client interface from the back-end processing enhances the application can be applied on a wide scale to the edge server infrastructure to reduce the centralized demands on the service providers.

It is therefore intended that the foregoing detailed description be regarded as illustrative rather than limiting, and that it be understood that it is the following claims, including all equivalents, that are intended to define the spirit and scope of this invention.

I claim:

1. An apparatus for facilitating communications between a client and a plurality of servers over a network, said network comprising a first sub-network comprising said client, said apparatus comprising:

a proxy server coupled with said first sub-network and operative to selectively proxy said communications between said client and said plurality of servers;

a filter coupled between said sub-network and said proxy server and operative to receive, from a first entity operating a first server of said plurality of servers, first criteria for intercepting and modifying said communications, and receive, from a second entity different from said first entity and operating a second server of said plurality of servers, second criteria for intercepting and modifying said communications, said filter being further operative to selectively intercept said communications prior to receipt by said proxy server based on said first and second criteria; and a request modifier coupled with said filter and operative to modify said selectively intercepted communications based on said first and second criteria.

2. The apparatus of claim 1, wherein said filter is further operative to filter out said communications originating from a second sub-network different from said first sub-network.

3. The apparatus of claim 2, wherein said filter is further operative to identify an originating sub-network of said communications based on an internet protocol address associated with said communications.

4. The apparatus of claim 1, wherein said filter is further operative to filter out communications not originating from said client.

5. The apparatus of claim 1, wherein said filter is further operative to filter out malicious program code within said communications.

6. The apparatus of claim 1, wherein said filter is further operative to filter out unauthorized program code within said communications.

7. The apparatus of claim 1 further comprising a first cache server coupled with said proxy server and said filter and operative to cache said communications from said plurality of servers to said client.

8. The apparatus of claim 7, wherein said first cache server is proximate to said client.

9. The apparatus of claim 8, wherein said first cache server is geographically proximate to said client.

10. The apparatus of claim 8, wherein said first cache server is logically proximate to said client based on a topology of said first sub-network.

11. The apparatus of claim 7, wherein said first cache server is further operative to share cached data with a second cache server.

12. The apparatus of claim 7, wherein said communications further comprises a request generated by said client to one of said plurality of servers, and further wherein said filter is further operative to attempt to satisfy said request from said cache server before sending said request to said proxy server.

13. The apparatus of claim 1 further operative to prevent said client from directly communicating with said first and second servers and not prevent said client from directly communicating with others of said plurality of servers.

14. The apparatus of claim 1, wherein said proxy server is not bound to said client.

15. The apparatus of claim 1, wherein said filter and said proxy server are coupled with an address translator, said address translator operative to selectively substitute an address associated with said proxy server and return said address to said client to direct communications from said client to said proxy server instead of said plurality of servers.

16. The apparatus of claim 1, wherein said proxy server is selectively bound to said at least one of said plurality of servers.

17. The apparatus of claim 16 wherein at least one other server of said plurality of servers is not bound with said proxy server and wherein said filter is further operative to filter out communications between said client and said other server and allow communications between said client and said at least one server to reach said proxy server.

18. The apparatus of claim 1, wherein said communications further comprises a request generated by said client to one of said said plurality of servers, said filter being further operative to validate said request and validate said one of plurality of servers.

19. The apparatus of claim 1 further comprising a point of presence.

20. An apparatus for facilitating communications between a client and a plurality of servers over a network, said network comprising a first sub-network comprising said client, said apparatus comprising:
- a request interceptor coupled with said first sub-network and operative to selectively intercept a first request prior to receipt by a first server of said plurality of servers, the first request being generated by said client and directed by said client to said first server;
- a request transmitter operative to transmit said intercepted first request to said first server as if originated by said apparatus;
- a response receiver operative to receive a response from said first server in response to said originated intercepted first request;
- a response transmitter operative to transmit said response to said client;
- a request filter coupled between said request interceptor and said request transmitter and operative to receive, from a first entity operating said first server of said plurality of servers, first criteria for intercepting and modifying said communications, and receive, from a second entity different from said first entity and operating a second server of said plurality of servers, second criteria for intercepting and modifying said communications, said filter being further operative to selectively filter said intercepted first request, based on said first and second criteria, prior to said request transmitter acting on said request; and
- a request modifier coupled with said request filter and operative to modify said intercepted first request, prior to said request transmitter acting on said request, based on said first and second criteria.

21. The apparatus of claim 20, wherein said request filter is further operative to filter out a second request originating from a second sub-network different from said first sub-network.

22. The apparatus of claim 21, wherein said request filter is further operative to identify an originating sub-network of said second request based on an internet protocol address associated with said second request.

23. The apparatus of claim 20, wherein said request filter is further operative to filter out a second request not originating from said client.

24. The apparatus of claim 20, wherein said request filter is further operative to filter out malicious program code within said request.

25. The apparatus of claim 20, wherein said request filter is further operative to filter out unauthorized program code within said request.

26. The apparatus of claim 20 further comprising a first cache server coupled with said response receiver, said response transmitter and said request filter and operative to cache said response from said first server to said response receiver.

27. The apparatus of claim 26, wherein said first cache server is proximate to said client.

28. The apparatus of claim 27, wherein said first cache server is geographically proximate to said client.

29. The apparatus of claim 27, wherein said first cache server is logically proximate to said client based on a topology of said first sub-network.

30. The apparatus of claim 26, wherein said first cache server is further operative to share cached data with a second cache server.

31. The apparatus of claim 26, wherein said filter is further operative to attempt to satisfy said request from said cache server before sending said request to said request transmitter.

32. The apparatus of claim 20 further operative to prevent said client from directly communicating with said first and second servers and not prevent said client from directly communicating with others of said plurality of servers.

33. The apparatus of claim 20, wherein said client intends said request to be received by said first server.

34. The apparatus of claim 20 further comprising an address translator, said address translator operative to selectively substitute an address associated with said request interceptor and return said address to said client to direct said request from said client to said request interceptor instead of said first server.

35. The apparatus of claim 20, wherein said request filter is selectively affiliated with said first and second servers.

36. The apparatus of claim 35 wherein said plurality of servers includes a third server not affiliated with said request filter and wherein said request filter is further operative to filter out communications between said client and said third server and allow communications between said client and said first and second servers to reach said request transmitter.

37. The apparatus of claim 20, wherein said filter is further operative to validate said request and validate said first server.

38. The apparatus of claim 20 further comprising a point of presence.

39. A method for facilitating communications between a client and a plurality of servers over a network, said network comprising a first sub-network comprising said client, said method comprising:
- (a) receiving, from a first entity operating a first server of said plurality of servers, first criteria for intercepting and modifying said communications, and receiving, from a second entity different from said first entity and operating a second server of said plurality of servers, second criteria for intercepting and modifying said communications;
- (b) intercepting, selectively, a first data transmission prior to receipt by said first server, the first data transmission being generated by said client and directed by said client to said first server;
- (c) filtering said selectively intercepted first data transmission based on said first and second criteria;
- (d) modifying said selectively intercepted first data transmission based on said first criteria; and
- (e) proxying said modified selectively intercepted first data transmission based on said modifying.

40. The method of claim 39, wherein (c) further comprises filtering out a second request originating from a second sub-network.

41. The method of claim 39, wherein (c) further comprises filtering out malicious program code within said selectively intercepted first data transmission.

42. The method of claim 39, wherein (c) further comprises filtering out unauthorized program code with said selectively intercepted first data transmission.

43. The method of claim 39, further comprising:
- (f) caching, selectively, a second data transmission generated by said first server in a cache server.

44. The method of claim 43, wherein said selectively intercepted first data transmission further comprises a request, and wherein (c) further comprises attempting to satisfy said request from said cache server.

45. The method of claim 39, further comprising:
(f) preventing said client from directly communicating with said first and second servers.

46. The method of claim 39, wherein (b) further comprises said selective intercepting being implemented by a transmission interceptor, said method further comprising:
(f) directing said client to send said first data transmission to said transmission interceptor.

47. The method of claim 39, wherein (c) further comprises validating said first data transmission and validating said first server.

48. The method of claim 39, wherein (b) further comprises selectively intercepting said first data transmission at a point of presence.

49. A method for facilitating communications between a client and a plurality of servers over a network, said network comprising a first sub-network comprising said client, said method comprising:
(a) receiving, from a first entity operating a first server of said plurality of servers, first criteria for intercepting and modifying said communications, and receiving, from a second entity different from said first entity and operating a second server of said plurality of servers, second criteria for intercepting and modifying said communications;
(b) filtering a first data transmission prior to receipt by said first server, the first data transmission being generated by said client and directed by said client to said first server, to selectively intercept said first data transmission based on said first and second criteria;
(c) modifying said selectively intercepted first data transmission based on said first and second criteria;
(d) originating said modified filtered intercepted first data transmission to said first server based on said modifying;
(e) receiving a response from said first server in response to said originated modified filtered intercepted first data transmission; and
(f) transmitting said response to said client.

50. The method of claim 49, wherein (b) further comprises filtering out a second data transmission originating from a second sub-network.

51. The method of claim 49, wherein (b) further comprises filtering out malicious program code within said selectively intercepted first data transmission.

52. The method of claim 49, wherein (b) further comprises filtering out unauthorized program code with said selectively intercepted first data transmission.

53. The method of claim 49, further comprising:
(g) caching, selectively, said response in a cache server.

54. The method of claim 53, wherein said selectively intercepted first data transmission further comprises a request, and wherein (b) further comprises attempting to satisfy said request from said cache server.

55. The method of claim 49, further comprising:
(g) preventing said client from directly communicating with said first server.

56. The method of claim 49, wherein (b) further comprises said selective intercepting being implemented by a transmission interceptor, said method further comprising:
(g) directing said client to send said first data transmission to said transmission interceptor.

57. The method of claim 49, wherein (b) further comprises validating said first data transmission and validating said first server.

58. The method of claim 49, wherein (b) further comprises selectively intercepting said first data transmission at a point of presence.

* * * * *

UNITED STATES PATENT AND TRADEMARK OFFICE
CERTIFICATE OF CORRECTION

| | | |
|---|---|---|
| PATENT NO. | : 7,437,482 B2 | Page 1 of 2 |
| APPLICATION NO. | : 10/853294 | |
| DATED | : October 14, 2008 | |
| INVENTOR(S) | : Peder J. Jungck | |

It is certified that error appears in the above-identified patent and that said Letters Patent is hereby corrected as shown below:

On the Title Page

Page 2, column 1, line 2, under "FOREIGN PATENT DOCUMENTS", after "2/1999" insert --............G06F--.

Page 2, column 1, line 4, under "FOREIGN PATENT DOCUMENTS", immediately after "12/28" insert --, 12/66--.

Page 2, column 1, line 5, under "FOREIGN PATENT DOCUMENTS", after "11/1999" insert --............G06F--.

Page 2, column 2, line 32, before "Compressed Data Format" delete "Deflate" and substitute --DEFLATE-- in its place.

Page 3, column 1, line 12, after "Technical" delete "Ppaers" and substitute --Papers-- in its place.

Page 3, column 2, line 32, after "96/96_4." delete "ps.qz" and substitute --ps.gz-- in its place.

In column 32, claim 3, line 9, after "based on an" delete "internet" and substitute --Internet-- in its place.

In column 32, claim 17, line 54, immediately after "claim 16" insert --,--.

In column 32, claim 18, line 62, after "one of" delete "said" (second occurrence).

In column 33, claim 22, line 40, after "based on an" delete "internet" and substitute --Internet-- in its place.

In column 34, claim 36, line 18, immediately after "claim 35" insert --,--.

In column 34, claim 43, line 58, immediately after "claim 39" delete ",".

In column 35, claim 45, line 1, immediately after "claim 39" delete ",".

UNITED STATES PATENT AND TRADEMARK OFFICE
CERTIFICATE OF CORRECTION

PATENT NO. : 7,437,482 B2
APPLICATION NO. : 10/853294
DATED : October 14, 2008
INVENTOR(S) : Peder J. Jungck It is certified that error appears in the above-identified patent and that said Letters Patent is hereby corrected as shown below:

In column 36, claim 53, line 14, immediately after "claim 49" delete ",".

In column 36, claim 55, line 20, immediately after "claim 49" delete ",".

Signed and Sealed this

Twenty-second Day of December, 2009

David J. Kappos
*Director of the United States Patent and Trademark Office*